(12) United States Patent
Baker

(10) Patent No.: US 7,200,605 B2
(45) Date of Patent: Apr. 3, 2007

(54) APPARATUS AND METHOD FOR NEGOTIATING AND GENERATING CONTRACT DOCUMENTS ON-LINE

(76) Inventor: Jeffrey T. Baker, 240 E. Montgomery Ave., Apt. 8, Ardmore, PA (US) 19003

( * ) Notice: Subject to any disclaimer, the term of this patent is extended or adjusted under 35 U.S.C. 154(b) by 202 days.

(21) Appl. No.: 09/942,826

(22) Filed: Aug. 31, 2001

(65) Prior Publication Data

US 2003/0046261 A1    Mar. 6, 2003

(51) Int. Cl.
*G06F 17/30* (2006.01)
(52) U.S. Cl. .................... 707/102; 707/101; 707/104.1
(58) Field of Classification Search .................... 705/1; 707/102, 10, 104.1, 100, 101, 103 R
See application file for complete search history.

(56) References Cited

U.S. PATENT DOCUMENTS

| | | | |
|---|---|---|---|
| 5,043,891 A | | 8/1991 | Goldstein et al. |
| 5,222,236 A | | 6/1993 | Potash et al. |
| 5,272,623 A | | 12/1993 | Grubb et al. |
| 5,283,731 A | * | 2/1994 | Lalonde et al. ................ 705/1 |
| 5,446,653 A | | 8/1995 | Miller et al. |

(Continued)

FOREIGN PATENT DOCUMENTS

WO     WO 01/59652 A2 *    8/2001

OTHER PUBLICATIONS

PrivacyBot.com, from Website, privacybot.com/about_faq.shtm.

(Continued)

*Primary Examiner*—Frantz Coby
(74) *Attorney, Agent, or Firm*—Plevy, Howard & Darcy, PC

(57) ABSTRACT

An apparatus adapted to generate contract documents includes a plurality of computing platforms; a plurality of memory storage devices coupled to the computing platforms, the plurality of memory devices including a first memory storage device storing a database of items, a second memory storage device storing rules corresponding to each item, a third memory storage device storing rules corresponding to each requester, a fourth memory storage device storing a database of generated documents, and a secure memory storage device; a plurality of networks coupled to the plurality of computing platforms, the computing platforms capable of receiving and transmitting requests for the items by requesters over the plurality of networks, the computing platforms being programmed to: process requests of items by at least one requester by determining if at least one of the items requested is stored in the first memory storage device, retrieving rules corresponding to the at least one requestor stored in the third memory storage device, retrieving from the second memory storage device rules relating to the requested items, and generating a document based on relationships between a first set of retrieved rules corresponding to the at least one requestor and a second set of retrieved rules corresponding to the requested items; display the document on a graphical user interface; transmit the document to the at least one requestor over the plurality of networks; permit the requestor to modify the document and transmit the modified document to the computing platforms; store the modified document in the secure storage device; deliver the modified document to at least one human operator for review; and permit the operator to modify data and the rules in the first, second, and third memory devices.

19 Claims, 18 Drawing Sheets

U.S. PATENT DOCUMENTS

| | | | |
|---|---|---|---|
| 5,584,025 A * | 12/1996 | Keithley et al. | 707/104.1 |
| 5,664,115 A * | 9/1997 | Fraser | 705/37 |
| 5,692,206 A | 11/1997 | Shirley et al. | |
| 5,729,751 A | 3/1998 | Schoolcraft | |
| 5,748,738 A | 5/1998 | Bisbee et al. | |
| 5,752,236 A | 5/1998 | Sexton et al. | |
| 5,781,773 A * | 7/1998 | Vanderpool et al. | 707/100 |
| 5,794,207 A | 8/1998 | Walker et al. | |
| 5,818,955 A | 10/1998 | Smithies et al. | |
| 5,893,914 A | 4/1999 | Clapp | |
| 5,970,479 A | 10/1999 | Shepherd | |
| 5,974,406 A * | 10/1999 | Bisdikian et al. | 707/1 |
| 6,014,680 A | 1/2000 | Sato et al. | |
| 6,021,202 A | 2/2000 | Anderson et al. | |
| 6,029,141 A * | 2/2000 | Bezos et al. | 705/27 |
| 6,055,519 A | 4/2000 | Kennedy et al. | |
| 6,067,531 A | 5/2000 | Hoyt et al. | |
| 6,098,034 A | 8/2000 | Razin et al. | |
| 6,134,534 A * | 10/2000 | Walker et al. | 705/26 |
| 6,185,683 B1 * | 2/2001 | Ginter et al. | 713/176 |
| 6,247,047 B1 * | 6/2001 | Wolff | 709/219 |
| 6,594,633 B1 * | 7/2003 | Broerman | 705/1 |
| 2001/0041053 A1 * | 11/2001 | Abecassis | 386/83 |
| 2006/0080592 A1 * | 4/2006 | Alves de Moura et al. | 715/501.1 |
| 2006/0107304 A1 * | 5/2006 | Cleron et al. | 725/135 |

OTHER PUBLICATIONS

*How QuickForms Can Help You*, from Website, quickforms.net/quickforms/howcan.html.

*100+ plain-English contracts for about the same price as half an hour with a lawyer*, from Website, 222.Jian.com/html.p_agb.asp.

*Sealing Contracts With Digital Signatures*, Kurt Olender, from Website, encommerce.com/news/special_reports/olender.shtm.

* cited by examiner

APPARATUS AND METHOD FOR NEGOTIATING AND GENERATING CONTRACT DOCUMENTS ON-LINE

BACKGROUND OF THE INVENTION

1. Field of the Invention

The present invention relates to an apparatus and method for generating contract documents, and more particularly to an apparatus and method for generating custom contract documents using standard terms and conditions while eliminating the need for a library of multiple form agreements.

2. Discussion of the Related Art

Advances in computer processing power and network communications have made information from a wide variety of sources available to users on computer networks. Computer networking allows network computer users to share information, software applications and hardware devices, and internetworking enables a set of physical networks to be connected into a single network, such as the Internet. Computers connected to the Internet or connected to networks other than the Internet also have access to information stored on those networks. The World Wide Web (Web), a hypermedia system used on the Internet, enables hypertext linking, whereby documents automatically reference or link other documents located on connected computer networks around the world. Thus, users connected to the Internet have almost instant access to information stored in relatively distant regions.

A page of information on the Web may include references to other Web pages and may include a broad range of multimedia data including textual, graphical, audio, and animation information. Currently, Internet users retrieve information from the Internet, through the Web by "visiting" a web site on a computer that is connected to the Internet.

The website is, in general terms, a server application that displays information stored on a network server computer. The web site accepts connections from client programs, such as Internet browser applications. Browser applications, such as Microsoft Explorer™ or Netscape Internet Browser™, allow Internet users to access information displayed on the website. Most browser applications display information on computer screens and permit a user to navigate through the Web using a mouse. Like other network applications, Web browsing uses a client-server paradigm. When given a Uniform Resource Locator (URL) of a document, the browser application becomes a client and contacts a server application specified in the URL to request the document. After receiving the document from the server application, the browser application displays the document to the user. When the browser application interacts with the server application, the two applications follow the Hyper-Text Transport Protocol (HTTP). HTTP allows the browser application to request a specific article, which the server application then returns. To ensure that browser applications and server applications inter-operate unambiguously, HTTP defines the exact format for requests sent from the browser application to the server application as well as the format of replies that the server application returns.

With the proliferation of physical networks connected to the Internet, many websites have become accessible to business users of the Internet as a virtual marketplace, commonly referred to as e-commerce or business to business (B2B). This virtual marketplace allows businesses to do over the Internet what in the past could only be done in person, telephonically, or in writing. While efforts to date have improved the automation of generating contract documents by storing standard contract language, i.e., "boilerplate," and prompting users to input terms that are unique to a particular contract, the related art has not shifted the paradigm for generating contracts in an on-line B2B virtual marketplace environment. Furthermore, while orders for goods and services are commonly placed on-line, the remainder of the e-commerce transaction—contract negotiation and contract generation—is still largely performed off-line.

SUMMARY OF THE INVENTION

Accordingly, the present invention is directed to an apparatus and method of negotiating and generating a contract document on-line that substantially obviates one or more of the problems due to the limitations and disadvantages of the related art.

An object of the present invention is to negotiate contract terms, generate contract documents, and execute these agreements on-line for e-commerce transactions.

Another object of the present invention is to automate the creation of a contract and various other documents related to a negotiated contract.

Yet another object of the present invention is to customize contracts associated with a specific order using standard terms and conditions for each product or product category.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the apparatus adapted to generate contract documents includes a plurality of computing platforms; a plurality of memory storage devices coupled to the computing platforms, the plurality of memory devices including a first memory storage device storing a database of items, a second memory storage device storing rules corresponding to each item, a third memory storage device storing rules corresponding to each requester, a fourth memory storage device storing a database of generated documents, and a secure memory storage device; a plurality of networks coupled to the plurality of computing platforms, the computing platforms capable of receiving and transmitting requests for the items by requestors over the plurality of networks, the computing platforms being programmed to: process requests of items by at least one requestor by determining if at least one of the items requested is stored in the first memory storage device, retrieving rules corresponding to the at least one requester stored in the third memory storage device, retrieving from the second memory storage device rules relating to the requested items, and generating a document based on relationships between a first set of retrieved rules corresponding to the at least one requestor and a second set of retrieved rules corresponding to the requested items; display the document on a graphical user interface; transmit the document to the at least one requestor over the plurality of networks; permit the requestor to modify the document and transmit the modified document to the computing platforms; store the modified document in the secure storage device; deliver the modified document to at least one human operator for review; and permit the operator to modify data and the rules in the first, second, and third memory devices.

In another aspect, the method to generate contract documents includes providing at least three databases and a maintenance engine for at least one of the databases; generating at least one document as a function of relationships between the at least three databases; providing the document for review by at least one of a customer, a salesperson, and a legal specialist; storing the reviewed document in a protected format; and submitting the document to at least one customer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate the embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
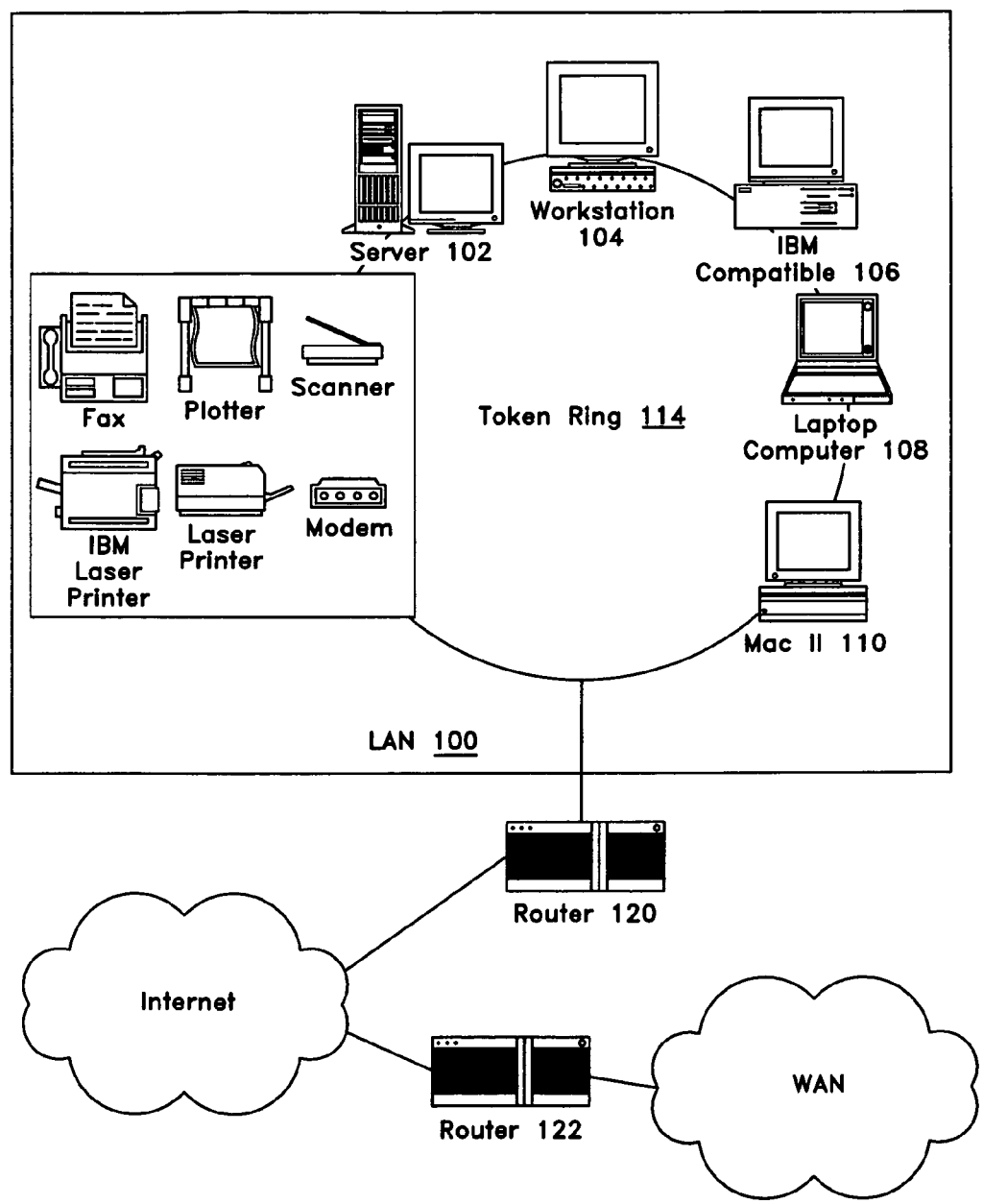
FIG. 1 illustrates a computer network in which the present invention may be incorporated in accordance with the present invention.

FIG. 1 is an example of a local area network (LAN) 100 that is configured to utilize a non-repudiation protocol. LAN 100 comprises a server 102, four computer systems 104, 106, 108, and 1110, and peripherals 112, such as printers and other devices that may be shared by components on LAN 100. Computer systems 104, 106, 108, and 1110 may serve as clients for server 102 and/or as clients and/or servers for each other and/or for other components connected to LAN 100. Components on LAN 100 are preferably connected together by cable media, for example copper or fiber-optic cable and the network topology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs, or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and the routers that connect them must adhere to a standard protocol. Computer networks connected to the Internet and to other networks typically use TCP/IP Layering Model Protocol. It should be noted that other networking protocols may be used.

Figure 2:
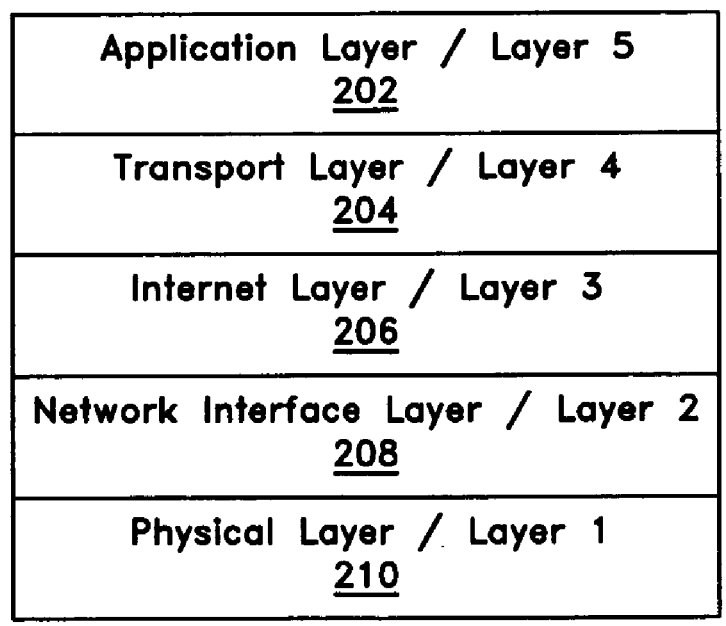
FIG. 2 illustrates the TCP/IP Layering Model Protocol used during communications between components on the computer network in accordance with the present invention.

As illustrated in FIG. 2, the TCP/IP Layering Model comprises an application layer (Layer 5) 202, a transport layer (Layer 4) 204, an Internet Layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

Figure 3:
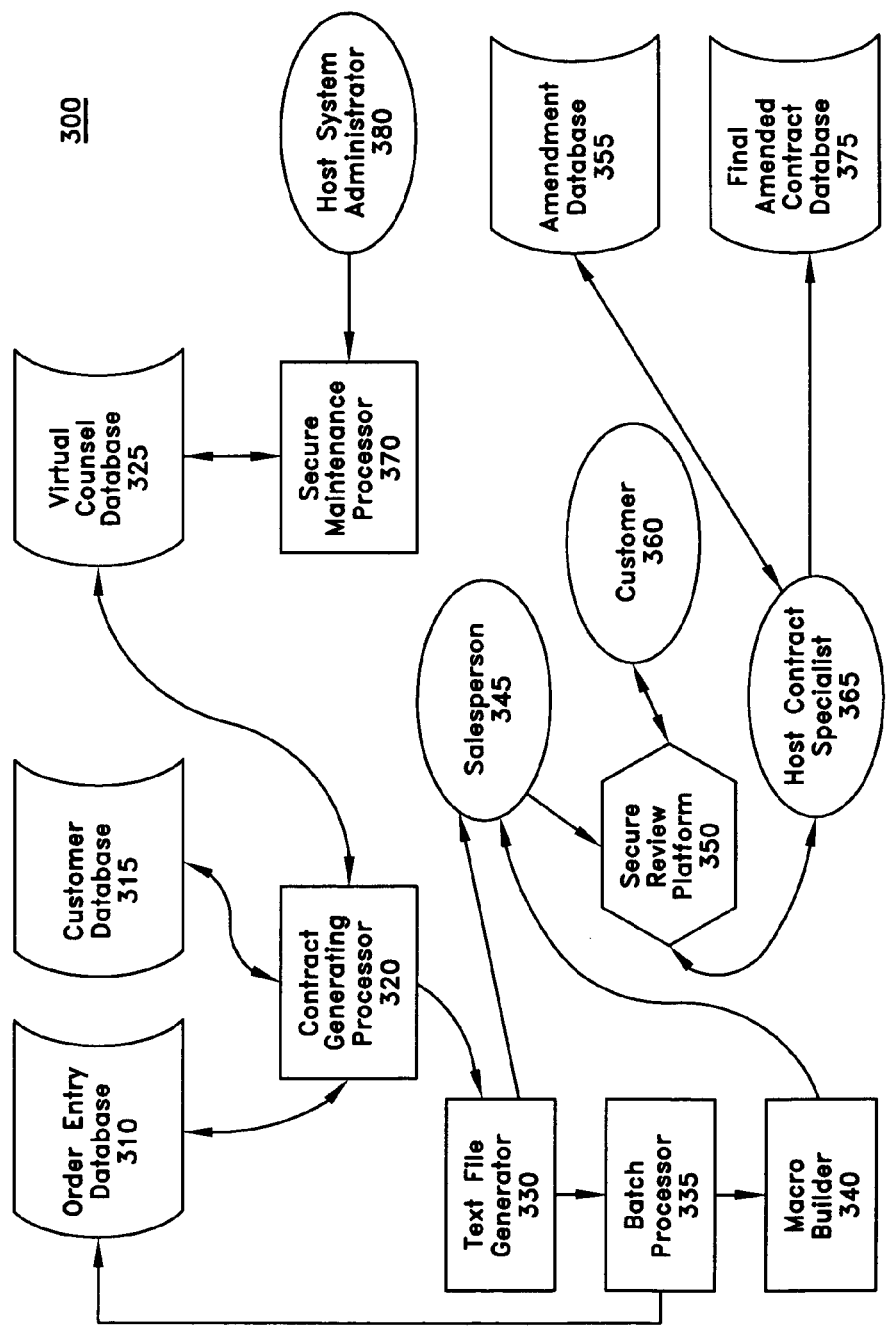
FIG. 3 is a block diagram that illustrates a preferred embodiment of a system for negotiating and generating a contract document in accordance with the present invention.

Referring to FIG. 3, a system 300 for negotiating and generating a contract document on-line according to the present invention includes an order entry database 310 which is connected to a contract generating processor 320. The order entry database 310 may utilize a commercial database software application such as Microsoft™ Access. Data structures, such as a plurality of products, are defined and maintained in the order entry database 310. The order entry database 310 communicates only with the contract generating processor 320, which manipulates the data structures maintained in the order entry database 310. The contract generating processor 320 is also connected to a customer database 315. Data structures, such as customer preferences, buying history, and credit terms, are defined and maintained in the customer database 315. The customer database 315 communicates only with the contract generating processor 320, which manipulates the data structures maintained in the customer database 315. The customer database 315 may utilize a commercial software application, such as Microsof™ Access. The contract generating processor 320 is also connected to a virtual counsel database 325. The virtual counsel database 325 defines and maintains data structures, such as e-terms and characteristics of the plurality of products maintained in the order entry database 310. The contract generating processor 320 manipulates data structures maintained in the virtual counsel database 325. The virtual counsel database 325 may utilize a commercial software application, such as Microsoft™ Access. The virtual counsel database is connected to a secure maintenance processor 370, which manipulates the data structures maintained in the virtual counsel database 325. A host system administrator 380 inputs instructions via an object-oriented platform (not shown) to the secure maintenance processor 370. The host system administrator 380 accesses the object-oriented platform via a security gateway (not shown) by entering a password or the like.

The contract generating processor 320 generates a draft contract document and communicates the draft contract document to a text file generator 330. The draft contract in the text file generator 330 is a readable file which may be an ASCII (American Standard Code for Information Interchange) file. The text file generator 330 sends a notification, for example by email, to a salesperson 345 that the draft contract document is being formatted and will be transmitted to the salesperson 345 when completed. At approximately a same time, the text file generator 330 sends a notification to a batch processor 335. The batch processor 335 communicates the draft contract document to a macro builder 340. The batch processor 335 periodically checks for any unprocessed documents that are in a condition for processing by the system 300 and, if found, the batch processor 335 communicates to the order entry database 310 to initiate generation of a second contract document. The macro builder 340 may utilize a commercial word processing software application, such as Microsoft™ Word, to build the draft contract in a desired textual format, which results in a formatted contract document. The macro builder 340 transmits the formatted contract document to the salesperson 345 over the LAN 100 by e-mail or the like.

Once the salesperson 345 has received the formatted contract document, the salesperson 345 may transmit the formatted contract document to a secure review platform 350. The secure review platform 350 may be a website with a hypertext link to the formatted contracted document. The secure review platform 350 may be accessed, with a password or the like, by a host contract specialist 365 and a customer 360. Communications between the secure review platform 350 and the host contract specialist 365 are encrypted as are communications between the secure review platform 350 and the customer 360. The host contract specialist 365 and the customer 360 communicate to one another via the secure review platform 350. Changes to the formatted contract document that are negotiated between the host contract specialist 365 and the customer 360 result in an amended contract document. The host contract specialist 365 transmits the amended contract document to an amendment database 355. Data structures for a plurality of amended contract documents are defined and maintained in the amendment database 355. The host contract specialist 365 accesses and manipulates the plurality of amended contract documents in the amendment database 355. The amendment database 355 may utilize a commercial database software application, such as Microsoft™ Access.

If the host contract specialist 365 and the customer 360 reach an agreement, the host contract specialist 365 transmits a final amended contract to a final amended contract database 375. The final amended contract database 375 may utilize a commercial database software application, such as Microsoft™ Access. The final amended contract database 375 cannot be accessed without a password or the like. In this manner, the customer 360 is unable to alter the terms of the final amended contract. Thus, an electronic signature is not required to validate authenticity of an executed agreement.

Figure 4:
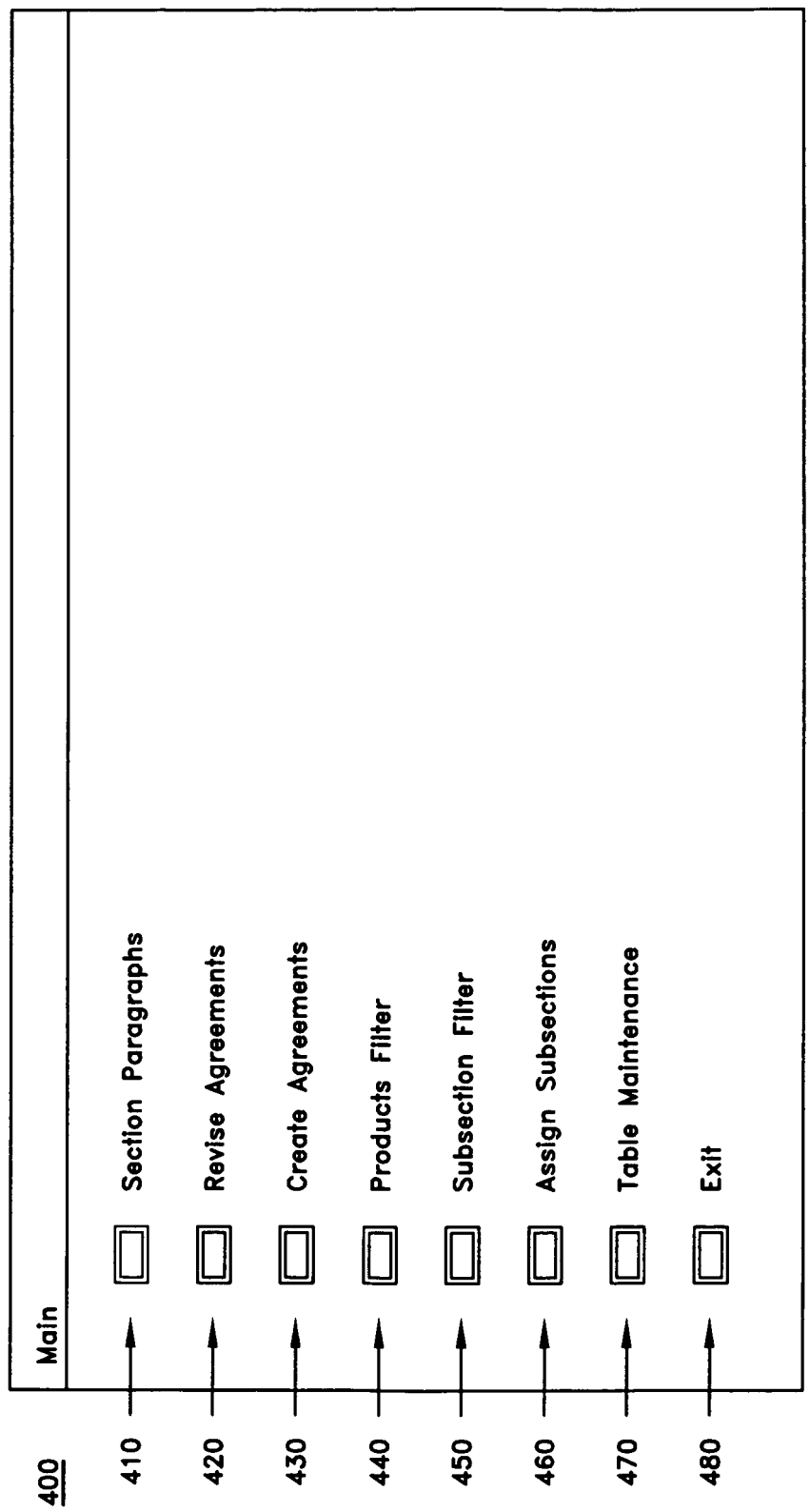
FIG. 4 illustrates a Main window for manipulating data structures in accordance with the present invention.
Figure 5:
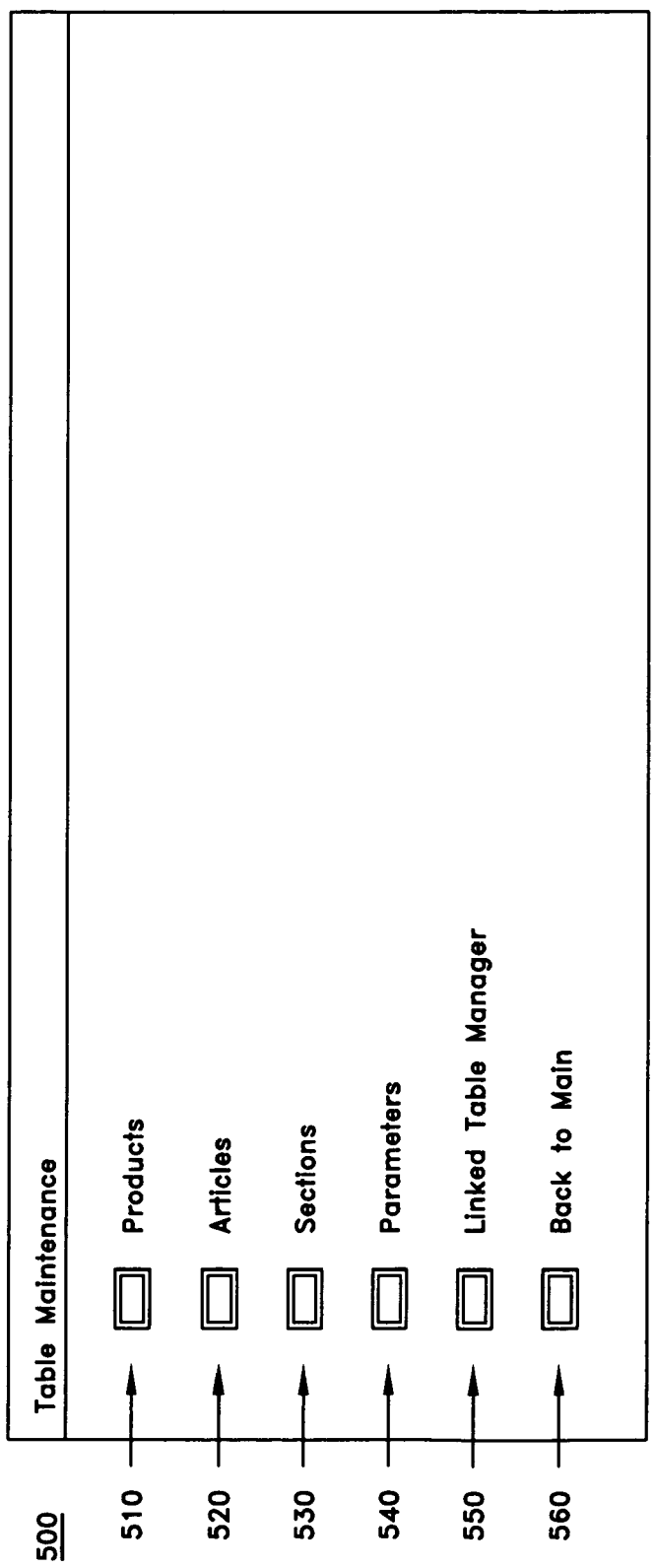
FIG. 5 illustrates a Table Maintenance window for accessing secondary functions in accordance with the present invention.
Figure 6:
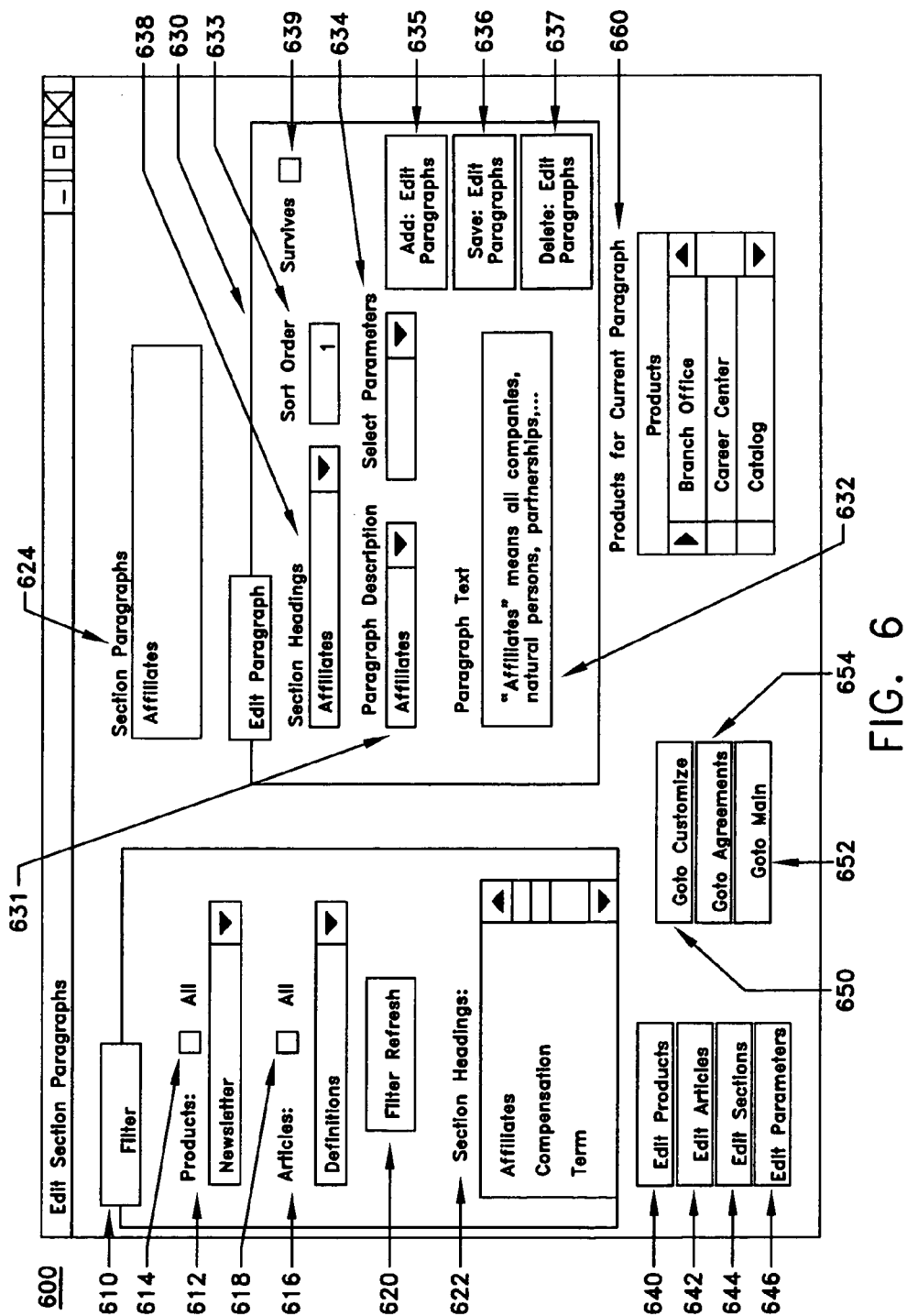
FIG. 6 illustrates an Edit Section Paragraphs window for entering and maintaining standard paragraphs associated with each product or product category functions in accordance with the present invention.

FIGS. 4 through 15 illustrate embodiments according to the present invention of object-oriented platforms from which the host system administrator 380 provides instructions to the secure maintenance processor 370. FIG. 4 depicts the functionality of a Main window 400 for manipulating data structures in accordance with the present invention. The Main window 400 includes a Section Paragraphs function 410, a Revise Agreements function 420, a Create Agreements function 430, a Products Filter function 440, a Subsection Filter function 450, an Assign Subsections function 460, a Table Maintenance function 470, and an Exit function 480. The Section Paragraphs function 410 adds, manipulates, and deletes standard text associated with different products. The Revise Agreements function 420 applies customized changes to a contract document. The Create Agreements function 430 manually creates and adds products to the contract document. The Products Filter function 440 associates existing paragraphs with articles and products. Articles refer to main categories within a generated contract document. Each article has multiple sections associated therewith. The Subsection Filter function 450 associates existing paragraphs with a particular section. A section includes one or more paragraphs. The Assign Subsections function 460 also associates existing paragraphs with the particular section. The Table Maintenance function 470 maintains data structures in the virtual counsel database 325. The Exit function 480 closes the application. The functionality of the Main window 400 will be described in detail below.

Selecting the Table Maintenance function 470 accesses a Table Maintenance window 500. The functionality of the Table Maintenance window 500 accesses secondary functions, an embodiment of which is illustrated according to the present invention in FIG. 5. The Table Maintenance window 500 includes a Products function 510, an Articles function 520, a Sections function 530, a Parameters function 540, a Linked Table Manager function 550, and a Back to Main function 560. The Products function 510 adds, manipulates, and deletes standard paragraphs associated with each product or product categories. The Articles function 520 adds, manipulates, and deletes a specific article. The Sections function 530 adds, manipulates, and deletes specific sections of a contract document. The Parameters function adds, manipulates, and deletes a plurality of standard parameters. The plurality of standard parameters are data structures, which can be defined and used to replace specific values, such as customer name and agreement number when the contract document is generated. A Linked Table Manager function 550 specifies a frequency with which data structures within the virtual counsel database 325, the customer database 315, and the order entry database 310 will be checked by the contract generating processor 320. A Back to Main function 560 closes the Table Maintenance window 500 and displays the Main window 400.

Selecting the Section Paragraphs function 410 accesses an Edit Section Paragraphs window 600. The functionality of the Edit Section Paragraphs window 600 enters and maintains standard paragraphs associated with each product or product category, an embodiment of which is illustrated according to the present invention in FIG. 6. Scroll bars are available to scroll beyond initially displayed areas if any displays exceed visible work areas. A Filter function 610 restricts a list of sections that may be manipulated at a given time. Selecting a Products option 612 restricts the list of sections associated with a particular product. Selecting a Products All option 614 retrieves all existing products. Selecting an Articles option 616 restricts the list of sections associated with a particular article. Selecting an Articles All option 618 retrieves all articles. Selecting a section heading from either a Section Headings List 622 or a Section Headings drop-down list 638 generates a list of paragraphs associated therewith. Selecting a Filter Refresh function 620 retrieves existing paragraph text and options associated with the section heading selected from the Section Headings List 622. After the section heading has been selected from the Section Headings List 622, the functions described below are available.

Selecting a line on a Sections Paragraph List 624 displays information for a selected paragraph in a plurality of fields in an Edit Paragraph section 630. Descriptive text for the selected paragraph is entered in a Paragraph Description field 631. In a Paragraph Text field 632 substantive text for the selected paragraph is displayed. Entering a number in a Sort Order field 633 indicates where the selected paragraph will be placed in a sequence of articles within a generated contract document. Selecting a parameter from a Select Parameter drop-down list 634 replaces specific values, such as customer name and agreement number, in the generated contract document. Checking the Survives selection box 639 includes the selected paragraph in a survival clause paragraph in the generated contract document. Selecting an Edit Paragraphs Add button 635 adds the selected paragraph to a product or article associated therewith, whereas selecting an Edit Paragraphs Delete button 637 removes the selected paragraph from the product or article associated therewith. Selecting an Edit Paragraphs Save button 636 will save the particular paragraph in the generated contract document. Selecting a product in a Products for Current Paragraphs field 660 specifies products associated with a selected paragraph.

A plurality of auxiliary functions are available in the Edit Section Paragraphs window 600. Selecting an Edit Products button 640 closes the Edit Section Paragraphs window 600 and displays an Edit Products window 700 where new product names can be added, existing product names can be changed, and information from an existing product can be copied. Selecting an Edit Articles button 642 closes the Edit Section Paragraphs window 600 and displays an Edit Articles window 800 where new articles can be added and a name of an existing article can be changed. Selecting an Edit Sections button 644 closes the Edit Section Paragraphs window 600 and displays an Edit Sections Heading window 900 where new sections can be added to an existing article and a name of an existing section can be changed in an article. Selecting an Edit Parameters button 646 closes the Edit Section Paragraphs window 600 and displays an Edit Parameters window 1000 where parameters can be added. Selecting a Goto Customize button 650 closes the Edit Section Paragraphs window 600 and displays a Revise Agreements window 1500 where customized changes to a generated contract document can be made. Selecting a Goto Agreements button 652 closes the Edit Section Paragraphs window 600 and displays a Create Agreements window 1400 where an agreement can be created manually. Selecting a Goto Menu button 654 closes the Edit Section Paragraphs window 600 and displays the Main window 400.

Figure 7A:
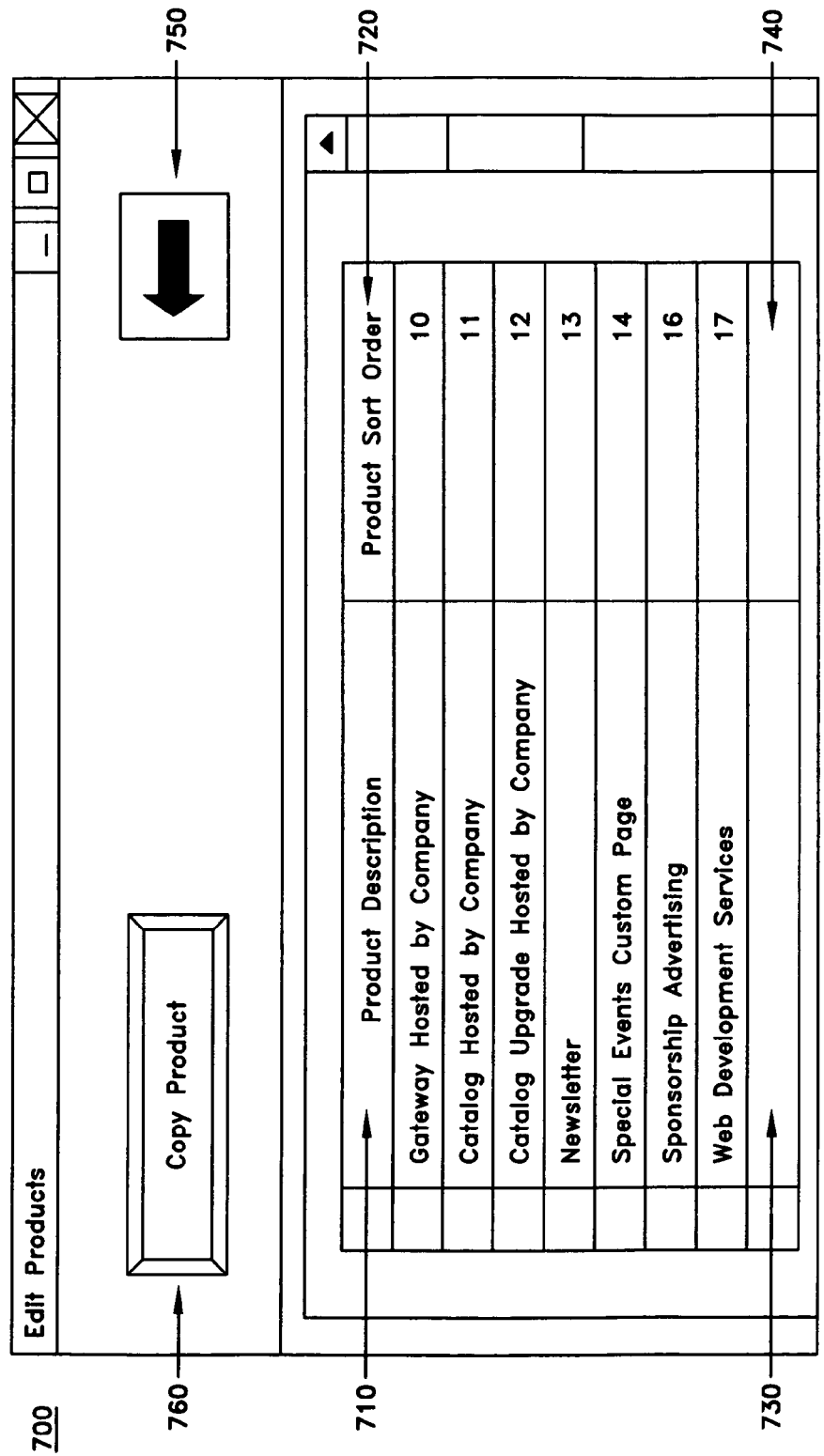
FIG. 7A illustrates an Edit Products window for adding a product to a specific contract document, copying information from an existing product to a new product, and changing the name of an existing product in accordance with the present invention.

Selecting the Products function 510 from the Table Maintenance window 500 or selecting the Edit Products button 640 from the Edit Section Paragraphs window 600 accesses an Edit Products window 700. The functionality of the Edit Products window 700 adds a product to a specific contract and changes a name of an existing product. FIG. 7A illustrates an embodiment of the functionality of the Edit Products window 700 according to the present invention. Scroll bars are available to scroll beyond initially displayed areas if any displays exceed visible work areas. The Edit Products window 700 includes a Product Description field 710, a Product Sort Order field 720, a Copy Product button 760, and an Edit Products Return icon 750. The Product Description field 710 displays a list of product names for the generated contract document, and the Product Sort Order field 720 displays a corresponding list of a sequential order in which the product names appear in the generated contract document. Entering a new product name in a blank product description field 730 adds a new product. The new product is automatically assigned a sequential sort order (not shown) which is displayed in a corresponding blank product sort order field 740. Changing an existing product name is performed by highlighting the existing product name in the Product Description Field 710 and entering new text. Selecting the Edit Products Return icon 750 closes the Edit Products window 700 and displays the Table Maintenance window 500. Selecting the Copy Product button 760 opens a Copy Product window 770.

Figure 7B:
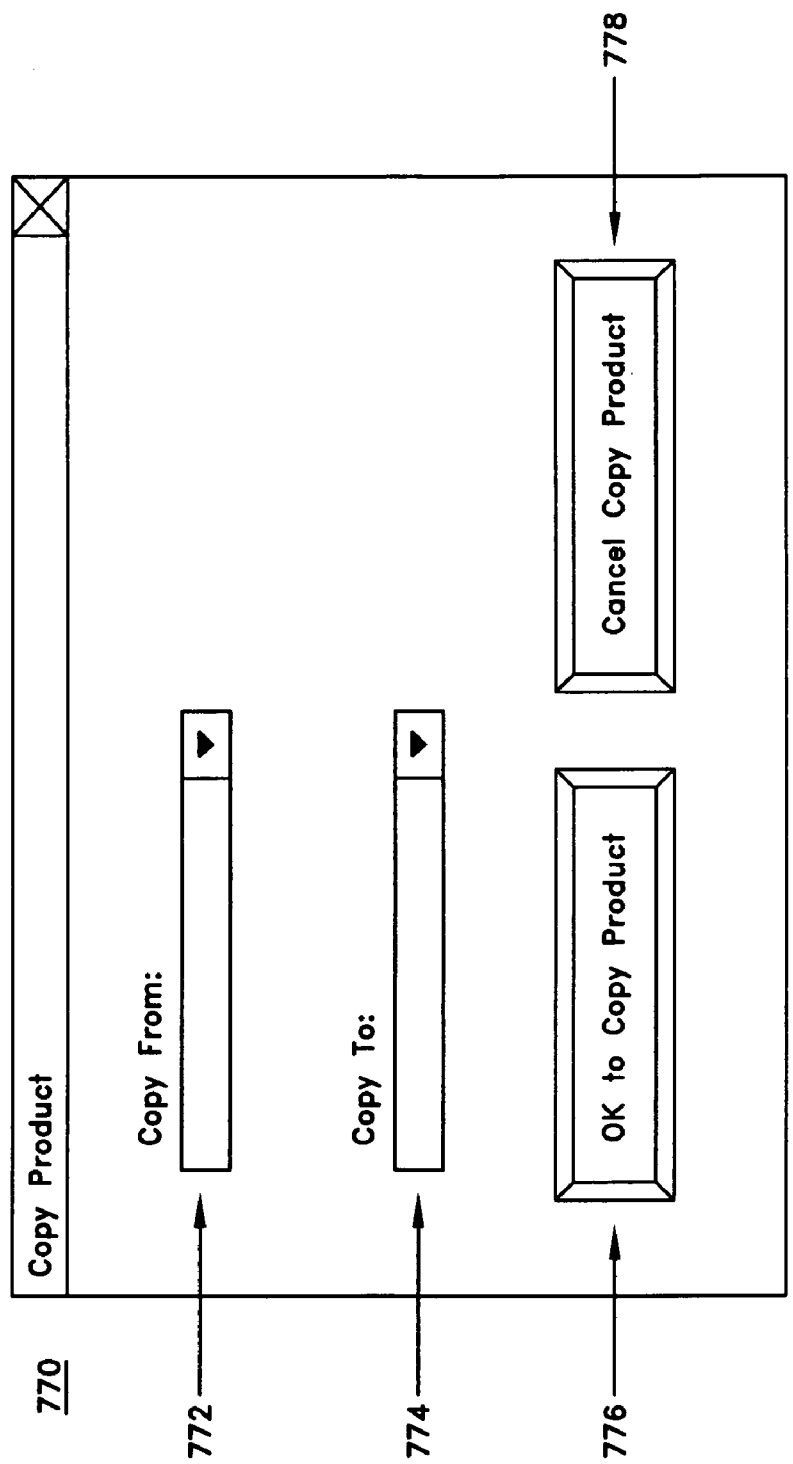
FIG. 7B illustrates a Copy from Existing Product window for copying information from an existing product to a new product in accordance with the present invention.
Figure 8:
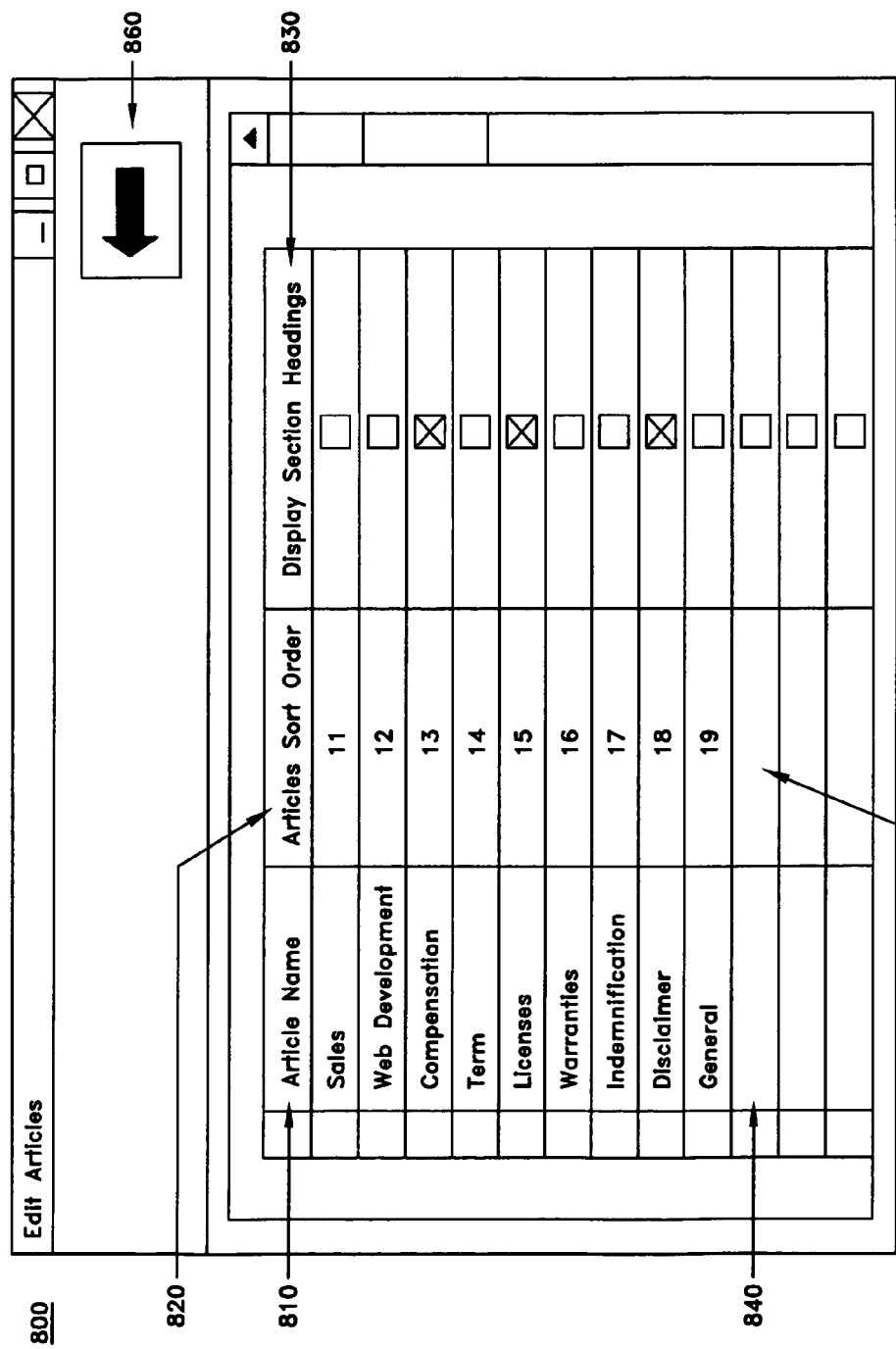
FIG. 8 illustrates an Edit Articles window for adding an article to a specific contract document and changing a name of an existing article in accordance with the present invention.
Figure 9:
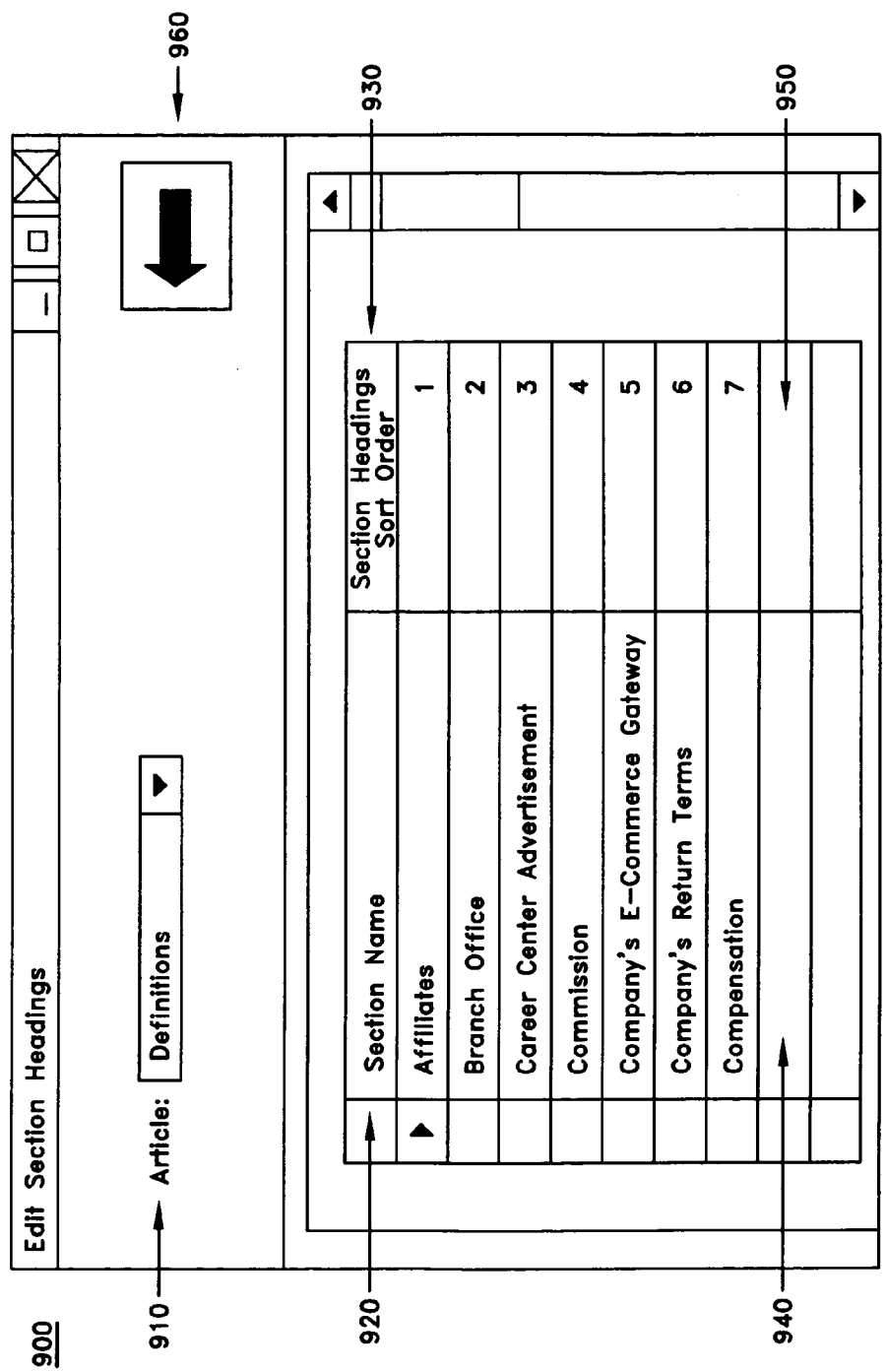
FIG. 9 illustrates an Edit Section Headings window for adding a new section to an existing article and changing a name of an existing section name in accordance with the present invention.
Figure 10:
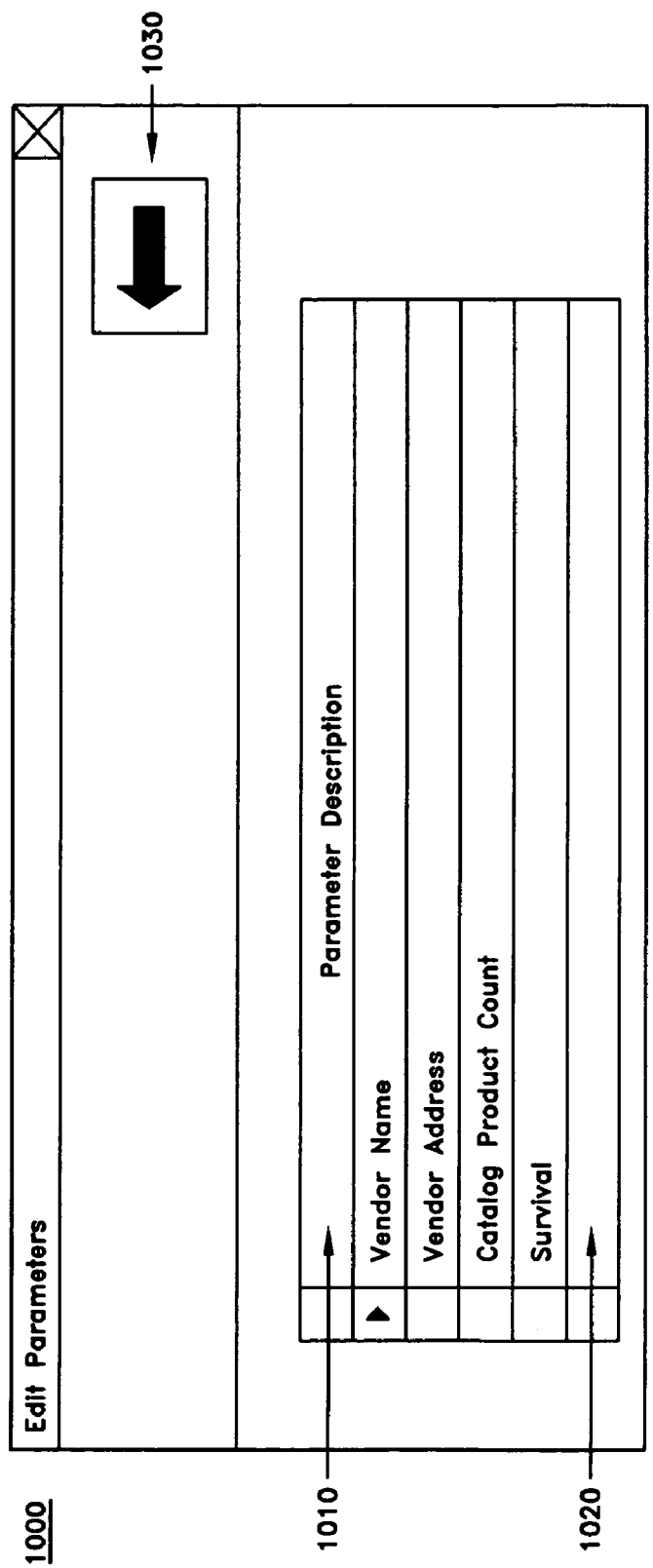
FIG. 10 illustrates an Edit Parameters window for adding, manipulating and removing sections from an existing article in accordance with the present invention.
Figure 11:
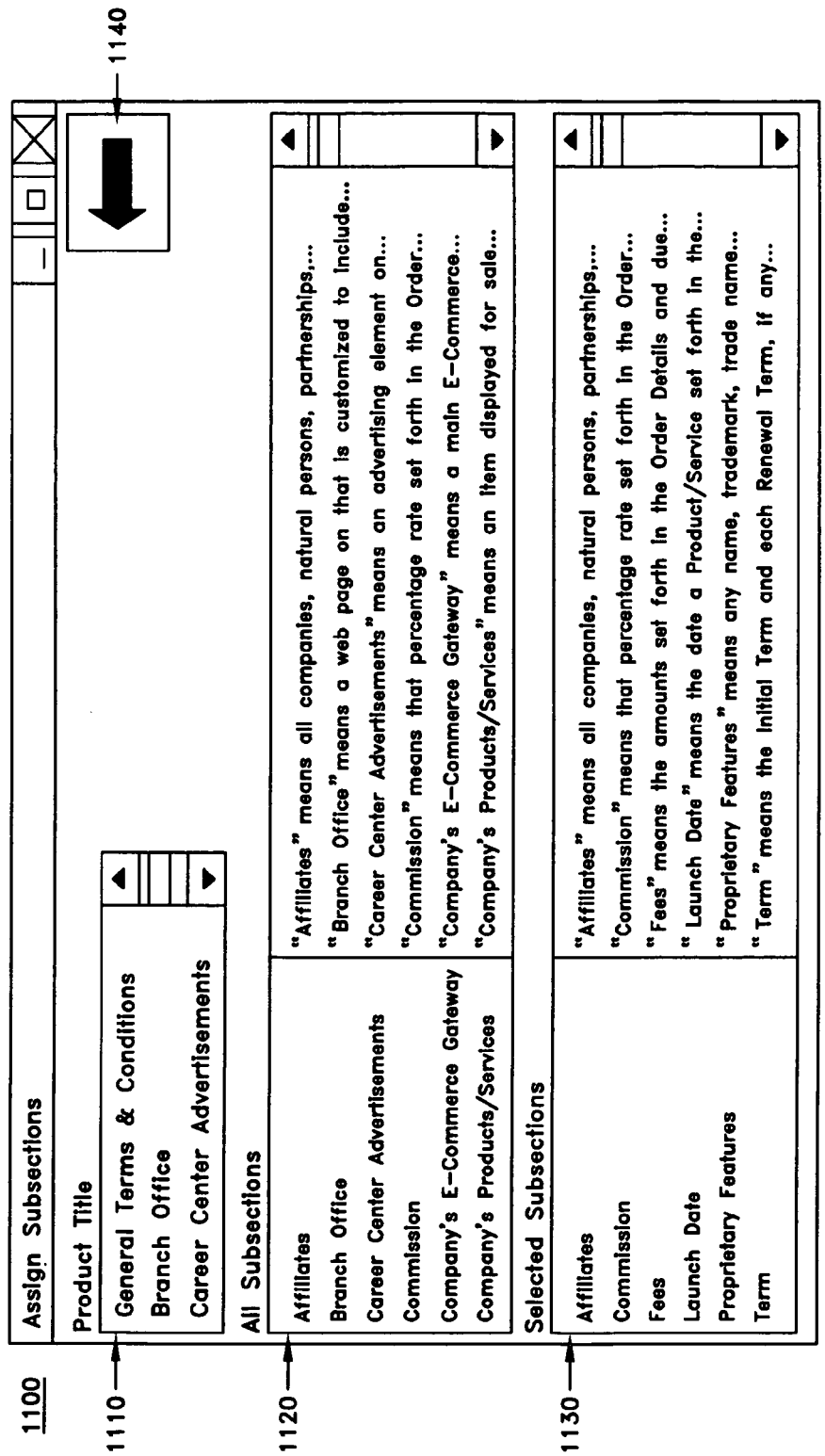
FIG. 11 illustrates an Assign Subsections window for adding existing paragraphs to and removing existing paragraphs from a product in accordance with the present invention.
Figure 12:
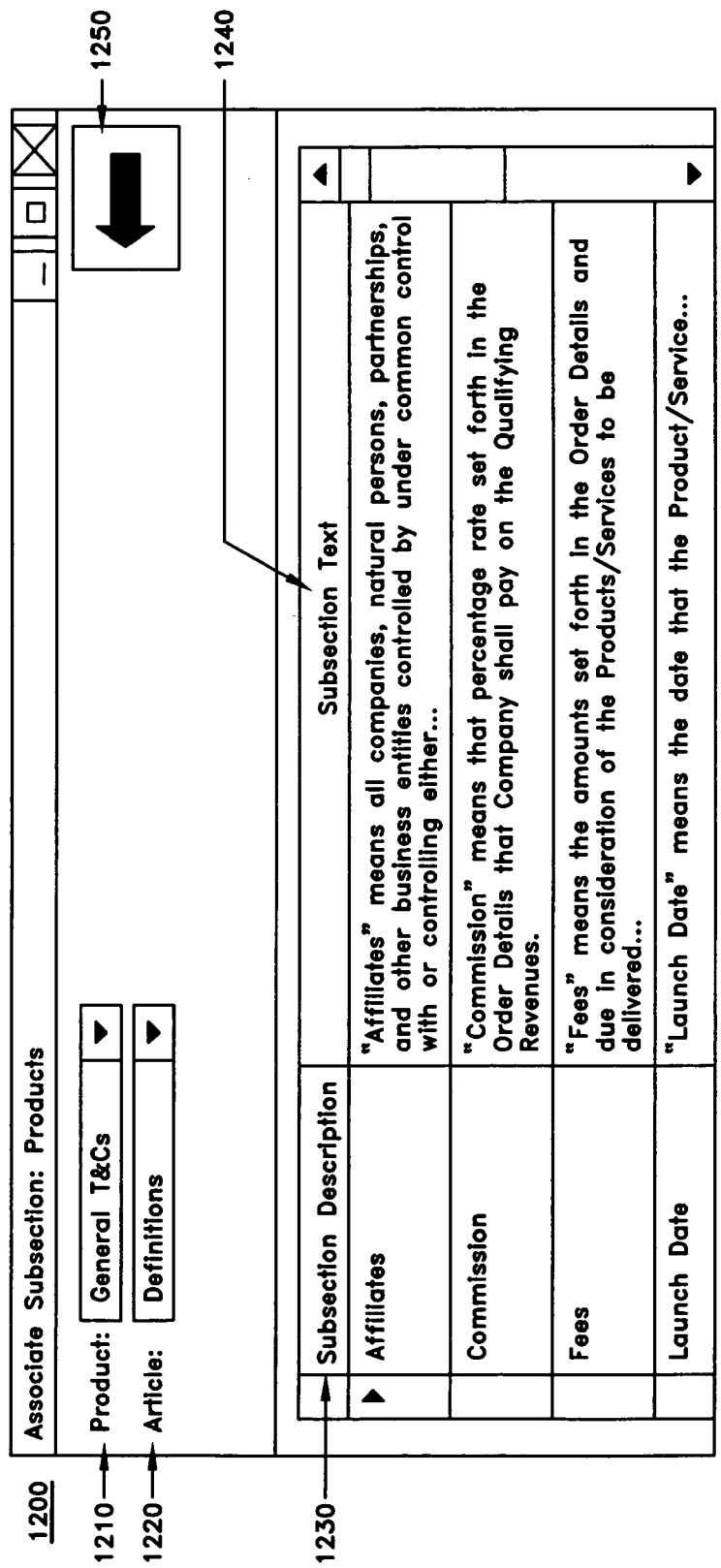
FIG. 12 illustrates an Associate Subsection: Products window for associating existing paragraphs with particular articles or products in accordance with the present invention.
Figure 13:
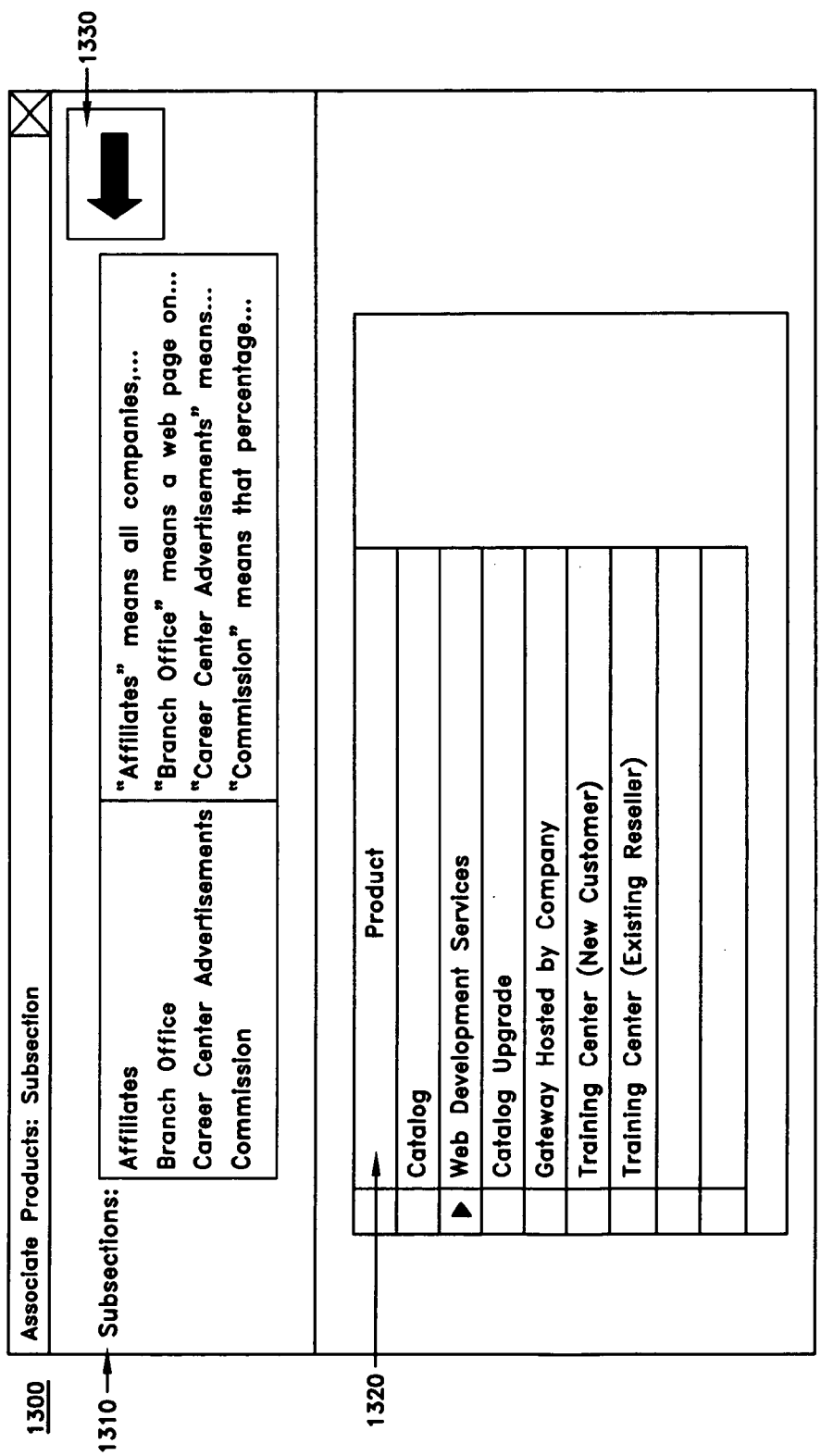
FIG. 13 illustrates an Associate Products: Subsection window for associating multiple products with existing paragraphs in accordance with the present invention.
Figure 14:
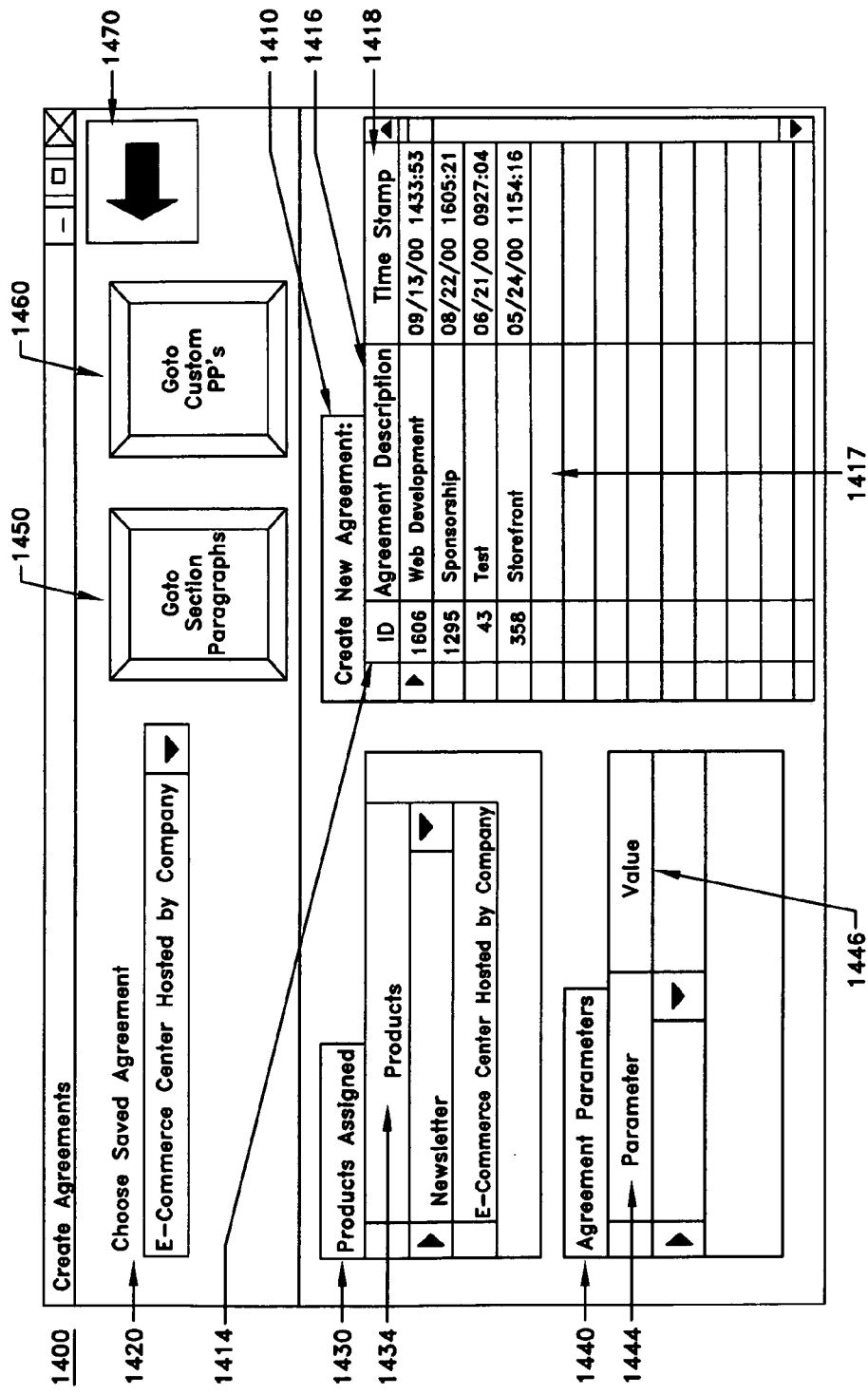
FIG. 14 illustrates a Create Agreements window for manually creating a new agreement in accordance with the present invention.

The functionality of the Copy Product window 770 copies information from an existing product to a new product, an embodiment of which is illustrated according to the present invention in FIG. 7B. Scroll bars are available to scroll beyond initially displayed areas if any displays exceed visible work areas. The Copy Product window 770 includes a Copy From field 772, a Copy To field 774, an OK to Copy Product button 776, and a Cancel Copy Product button 778. Selecting a drop-down button in the Copy From field 772 displays a list of available products, and product selected therefrom is displayed in the Copy From field 772. Selecting a drop-down button in the Copy To field 774 displays a list of available products, and a product selected therefrom is displayed in the Copy To field 774. Selecting the OK to Copy Product button 776 copies information from the product displayed in the Copy From field 772 to the product displayed in the Copy To field 774, and then closes the Copy Product window 770 and displays the Edit Products window 700. Selecting the Cancel Copy Product button 778 halts the selected operation, closes the Copy Product window 770, and displays the Edit Products window 700.

Selecting the Articles function 520 from the Table Maintenance window 500 or selecting the Edit Articles button 642 from the Edit Section Paragraphs window 600 accesses an Edit Articles window 800. The functionality of the Edit Articles window 800 adds an article to a generated contract document and changes a name of an existing article, an embodiment of which is illustrated according to the present invention in FIG. 8. Scroll bars are available to scroll beyond initially displayed areas if any displays exceed visible work areas. The Edit Articles window 800 includes an Article Name field 810, an Articles Sort Order field 820, a Display Section Headings field 830, and an Edit Articles Return icon 860. The Article Name field 810 includes a plurality of article names. Each article name in the Article Name field 810 has a corresponding numerical sort order displayed in the Articles Sort Order field 820. The numerical values in the Articles Sort Order field 820 control a sequence of the articles in the generated contract document. Selecting a checkbox in the Display Section Headings field 830 displays in the generated contract a section heading for the corresponding article in the Article Name field 810. Selecting and entering text in a next available blank article name field 840 adds a new article to the generated contract. The new article is assigned a corresponding sequential sort order value, which is displayed in a next available blank articles sort order field 850. Changing any of the plurality of existing article names is performed by highlighting an article name in the Article Name field 810 and entering new text. Selecting the Edit Articles Return icon 860 closes the Edit Articles window 800 and displays the Table Maintenance window 500.

Selecting the Sections function 530 from the Table Maintenance window 500 or selecting the Edit Sections button 644 from the Edit Section Paragraphs window 600 accesses an Edit Section Headings window 900. The functionality of the Edit Section Headings window 900 adds a new section to an existing article and changes a name of an existing section name, an embodiment of which is illustrated according to the present invention in FIG. 9. Scroll bars are available to scroll beyond initially displayed areas if any displays exceed visible work areas. The Edit Section Headings window 900 includes an Article drop-down list 910, a Section Name field 920, a Section Headings Sort Order field 930, and a Section Headings Return icon 960. The Article drop-down list 910 includes a plurality of article titles for a generated contract document. Selecting an article title from the Article drop-down list 910 displays a corresponding list of section names in the Section Name field 920 and a corresponding list of numerical values in the Section Headings Sort Order field 930. The numerical values in the Section Headings Sort Order field 930 control a sequence of the section names within the corresponding article. Selecting and entering text in a next available blank section name field 940 adds a new section name in the generated contract document. The new section name is assigned a corresponding sequential sort order value, which is displayed in a next available blank section name field 950. Changing an existing section name is performed by highlighting a desired section name in the Section Name field 920 and entering new text. Selecting a Section Headings Return icon 960 closes the Edit Section Headings window 900 and displays the Table Maintenance window 500.

Selecting the Parameters function 540 from the Table Maintenance window 500 or selecting the Edit Parameters button 646 from the Edit Section Paragraphs window 600 accesses an Edit Parameters window 1000. The functionality of the Edit Parameters window 1000 adds, manipulates, and removes sections from an existing article, an embodiment of which is illustrated according to the present invention in FIG. 10. Scroll bars are available to scroll beyond initially displayed areas if any displays exceed visible work areas. The Edit Parameters window 1000 includes a Parameter Description field 1010 and an Edit Parameters Return icon 1030. Selecting and entering text in a next available blank parameters description field 1020 adds a new section to an existing article. The new section is made available in the Select Parameter drop-down list 634 in the Edit Section Paragraphs window 600. This allows specific values to be assigned to designated parameters when the contract document is generated. By Selecting text in any of the fields of the Parameter Description field 1010 the selected text can be manipulated or removed. Any such manipulations or deletions will be reflected in the Select Parameter drop-down list 634. Selecting an Edit Parameters Return icon 1030 will close the Edit Parameters window 1000 and display the Table Maintenance window 500.

Selecting the Assign Subsections function 460 from the Main window 400 accesses an Assign Subsections window 1100. The functionality of the Assign Subsections window 1100 adds existing paragraphs to and removes existing paragraphs from a product, an embodiment of which is illustrated according to the present invention in FIG. 11. Scroll bars are available to scroll beyond initially displayed areas if any displays exceed visible work areas. The Assign Subsections window 1100 includes a Product Title list 1110, an All Subsections field 1120, a Selected Subsections field 1130, and an Assign Subsections Return icon 1140. The Product Title list 1110 includes a list of a plurality of product titles. The All Subsections field 1120 includes a left-hand column with a plurality of available subsection titles for a product title selected in the Product Title list 1110. The All Subsections field 1120 includes a right-hand column with substantive text corresponding to the subsection titles. Selecting a subsection title in the All Subsections field 1120 copies the selected subsection title to a left-hand column of the Selected Subsections field 1130 and creates an association of the selected subsection with the product selected in the Product Title list 1110. A right-hand column of the Selected Subsections field 1130, contains descriptive text corresponding to the selected subsection titles. The list of subsection titles in the left-hand column of the Selected Subsections field 1130 are added to the product title selected in the Product Title list 1110. Selecting a subsection title in the Selected Subsections field 1130 removes the selected subsection title from the Selected Subsections field 1130 and deletes any association of the selected subsection with the product selected in the Product Title list 1110. Selecting the Assign Subsections Return icon 1140 closes the Assign Subsections window 1100 and displays the Main window 400.

Selecting the Products Filter function 440 from the Main window 400 accesses an Associate Subsection: Products window 1200. The functionality of the Associate Subsection: Products window 1200 associates existing paragraphs with particular articles or products, an embodiment of which is illustrated according to the present invention in FIG. 12.

Scroll bars are available to scroll beyond initially displayed areas if any displays exceed visible work areas. The Associate Subsection: Products window 1200 includes a Product drop-down list 1210, an Article drop-down list 1220, a Subsection Description field 1230, a Subsection Text field 1240, and an Associate Subsection: Products Return icon 1250. One of a plurality of existing articles may be selected from the Article drop-down list 1220. The Subsection Description field 1230 displays a list of existing paragraphs. Selecting a particular paragraph from the Subsection Description field 1230 associates the selected paragraph with the article selected from the Article drop-down list 1220. Selecting duplicate paragraphs generates an error message. An existing paragraph may also be selected for deletion from the article selected in the Article drop-down list 1220. An existing paragraph may also be selected for deletion from the product selected in the Product drop-down list 1210. The Subsection Text field 1240 displays substantive text corresponding to each paragraph in the Subsection Description field 1230. Additionally, one of a plurality of existing products may be selected from the Product drop-down list 1210. Selecting the Associate Subsection: Products Return icon 1250 closes the Associate Subsection: Products window 1200 and displays the Main window 400.

Selecting the Subsection Filter function 450 from the Main window 400 accesses an Associate Products: Subsection window 1300. The functionality of the Associate Products: Subsection window 1300 associates multiple products with existing paragraphs, an embodiment of which is illustrated according to the present invention in FIG. 13. Scroll bars are available to scroll beyond initially displayed areas if any displays exceed visible work areas. The Associate Products: Subsection window 1300 includes a Subsection list 1310, a Product list 1320, and an Associate Products: Subsection Return icon 1330. The Subsections list 1310 includes a left-hand section of a list of available paragraph titles. A right-hand section of the Subsections list 1310 includes substantive text corresponding to the paragraph titles. The Product list 1320 includes a left-hand column of a plurality of buttons corresponding to individual product titles in a right-hand column of the Product list 1320. The plurality of buttons in the Product list 1320 indicate which product titles have been selected. Selecting any number of product titles in the Product list 1320 associates the products with the selected paragraph selected in the Subsections list 1310. Selecting the Associate Products: Subsection Return icon 1330 closes the Associate Products: Subsection window 1300 and displays the Main window 400.

Selecting the Create Agreements function 430 accesses a Create Agreements Window 1400. The functionality of the Create Agreements window 1400 manually creates a new agreement, an embodiment of which is illustrated according to the present invention in FIG. 14. The Create Agreements window 1400 includes a Create New Agreement field 1410, a Choose Saved Agreement drop-down list 1420, a Products Assigned field 1430, an Agreement Parameters field 1440, a GoTo Section Paragraphs button 1450, a GoTo Custom PP's button 1460, and a Create Agreements Return icon 1470. The Create New Agreement field 1410 includes an ID field 1414, an Agreement Description field 1416, and a Time Stamp field 1418. The Products Assigned field 1430 includes a Products field 1434. The Parameters field 1440 includes an Agreement Parameters field 1444, and a Value field 1446. To create a new agreement, a name for the new agreement in a next available agreement description field 1417 is entered in the Agreement Description field 1416. After the name for the new agreement has been entered, a sequential numerical identifier is assigned and displayed in a corresponding field in the ID field 1414 and a time stamp is displayed in a corresponding field in the Time Stamp field 1418. The new agreement is selected from the Choose Saved Agreement drop-down list 1420. One or more of a plurality of products listed in the Products field 1434 is then associated with the new agreement by selecting any of a plurality of corresponding select-buttons in the Products Assigned field 1430. Selecting any product more than once generates an error message. For each product selected from the Products field 1434, parameters are selected from a drop-down list in the Parameter field 1444. A parameter value for each selected parameter is entered in a corresponding field in the Value field 1446. Selecting the GoTo Section Paragraphs icon 1450 accesses the Edit Section Paragraphs window 600. Selecting the GoTo Custom PP's icon 1460 generates a new contract document using the information from the Create Agreements window 1400. Selecting a Create Agreements Return icon 1470 closes the Create Agreements window 1400 and displays the Main window 400.

Selecting the Revise Agreements function 420 from the Main window 400 accesses a Revise Agreements window 1500. The functionality of the Revise Agreements window 1500 makes changes to a generated contract document, an embodiment of which is illustrated according to the present invention in FIG. 15A. Scroll bars are available to scroll beyond initially displayed areas if any displays exceed visible work areas. The Revise Agreements window 1500 includes a Choose Agreement drop-down list 1502, an Agreement ID field 1504, a Refresh button 1506, an Edit Paragraphs menu 1510, an Output Agreement button 1520, a Goto Menu button 1530, a Goto Stock Paragraphs button 1532, a Goto Agreements button 1534, and a Paragraphs in Selected Agreement field 1540. The Edit Paragraphs menu 1510 includes an Add button 1512, a Modify button 1514, a Delete button 1516, and an Undelete button 1518. The Paragraphs in Selected Agreement field 1540 includes an Article field 1542, a Section Heading field 1544, a Paragraph Description field 1546, and a Paragraph Text field 1548.

To revise the generated contract document, either an agreement from the Choose Agreement drop-down list 1502 is selected or an agreement identifier in the Agreement ID field 1504 is entered. The Refresh button 1506 is then selected. Terms and conditions associated with the selected agreement are displayed in the Paragraphs in Selected Agreement field 1540. A paragraph may be selected by selecting any cell within a desired row. The selected paragraph is indicated by an arrow in a button bar in a far-left side of the Paragraphs in Selected Agreement field 1540. Selecting the Add button 1512 accesses an Add Custom Paragraph window 1550.

Figure 15A:
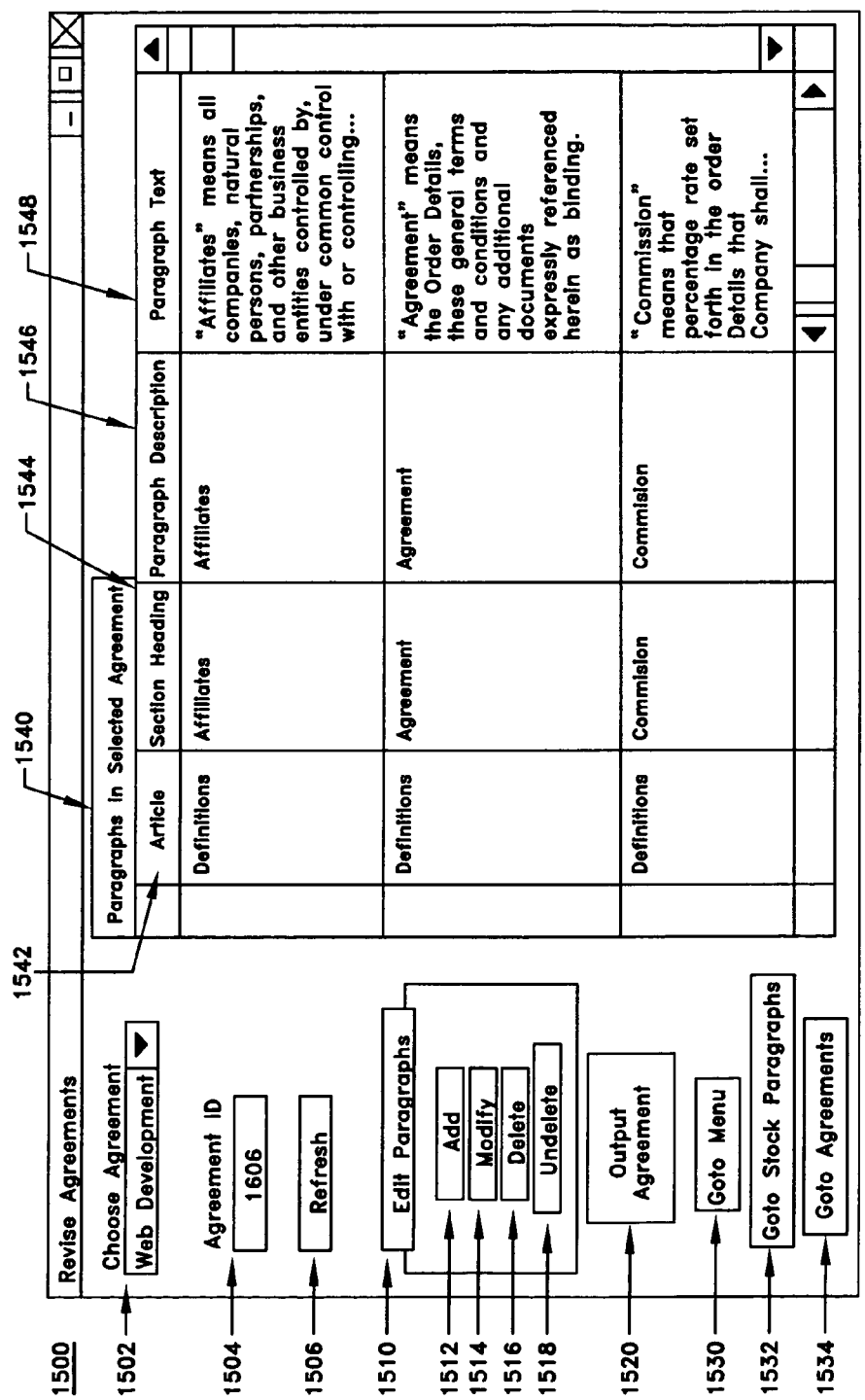
FIG. 15A illustrates a Revise Agreements window for making changes to a generated contract document in accordance with the present invention.
Figure 15B:
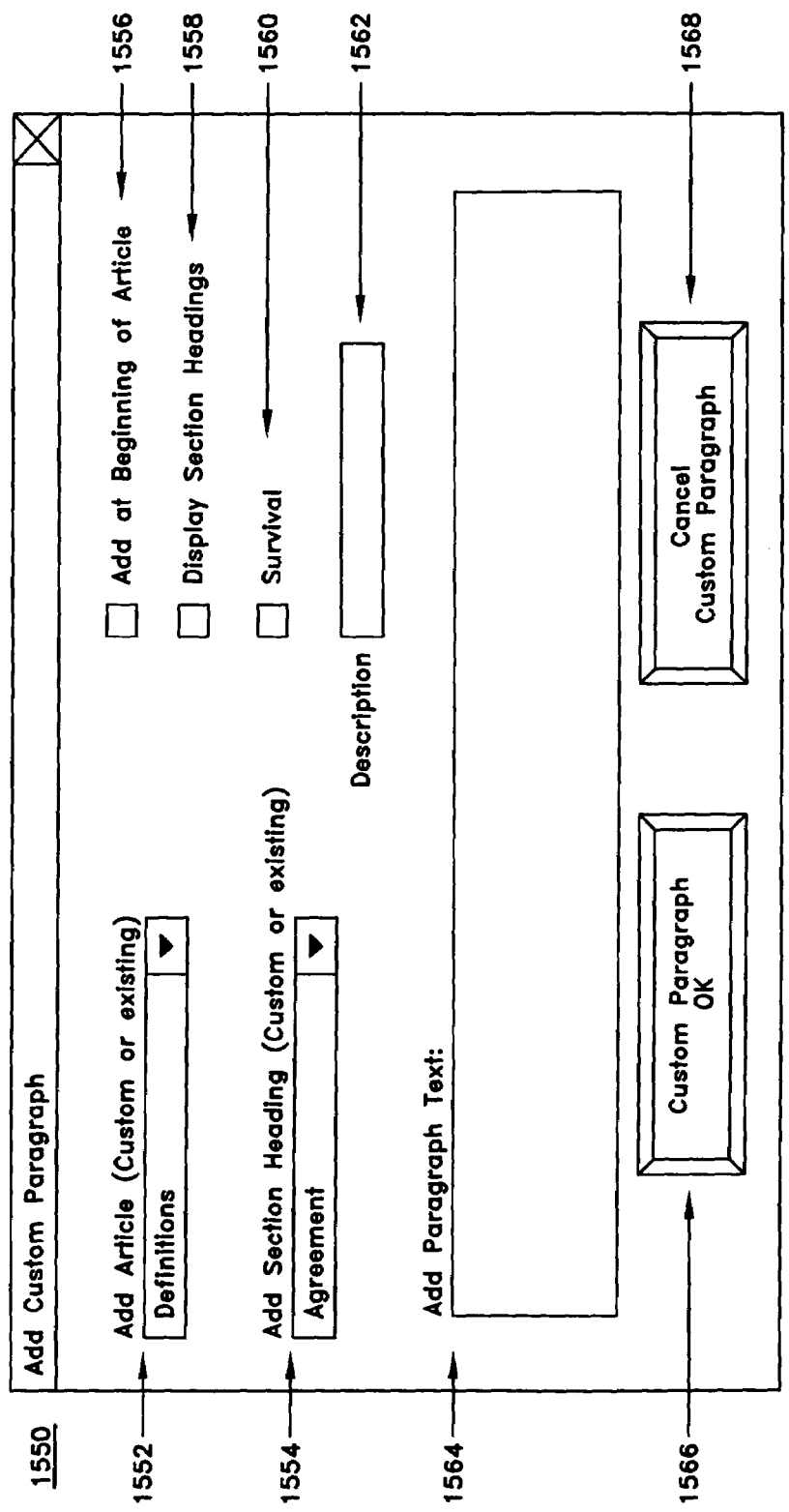
FIG. 15B illustrates a Custom Paragraph window for adding a new paragraph to a generated contract document in accordance with the present invention.
Figure 15C:
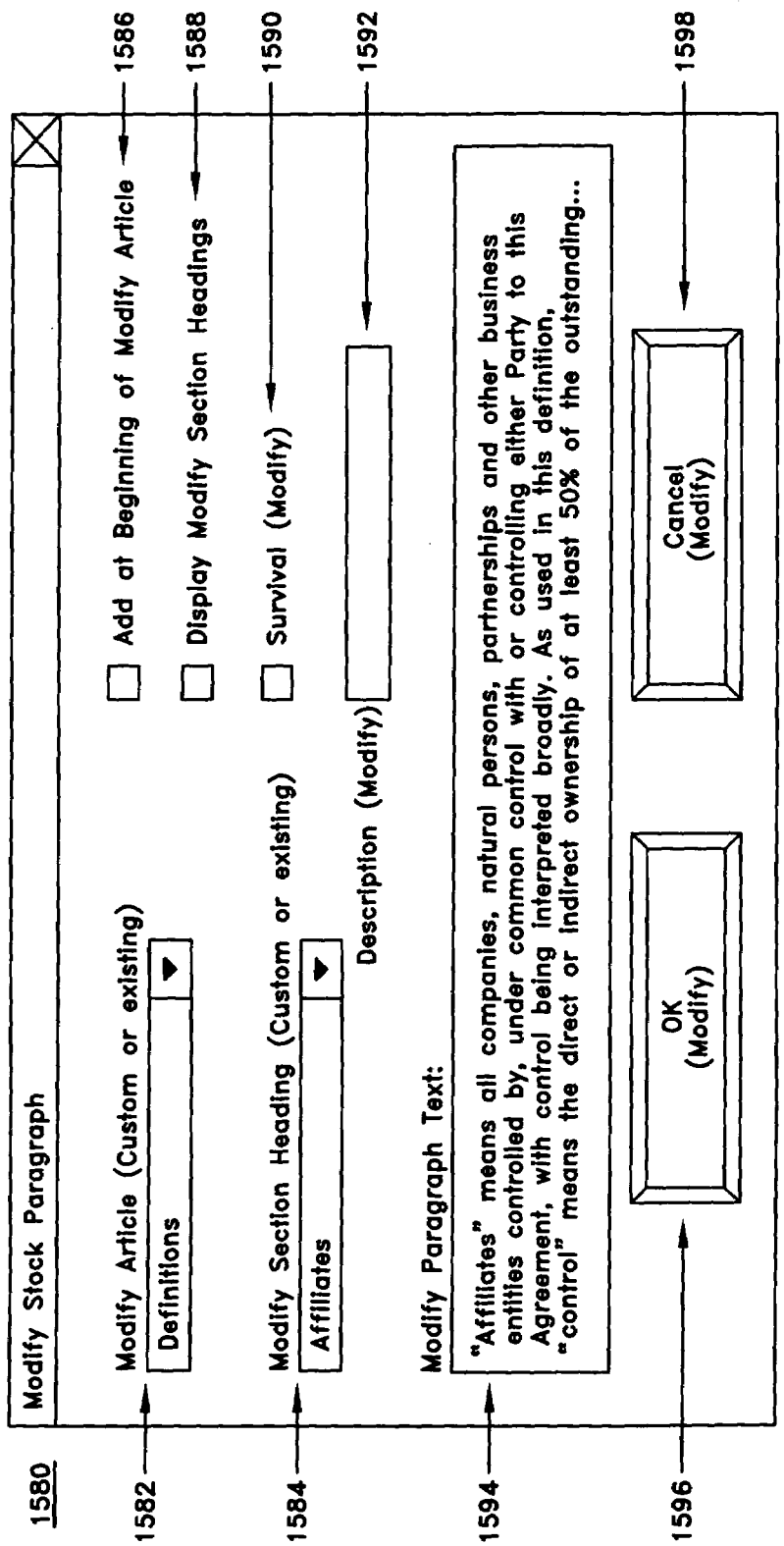
FIG. 15C illustrates a Modify Stock Paragraph window for modifying a paragraph of a generated contract document.

The functionality of the Add Custom Paragraph window adds a new paragraph to the generated contract, an embodiment of which is illustrated according to the present invention in FIG. 15B. Scroll bars are available to scroll beyond initially displayed areas if any displays exceed visible work areas. The Add Custom Paragraph window 1550 includes an Add Article (Custom or Existing) drop-down list 1552, an Add Section Heading (Custom or Existing) drop-down list 1554, an Add At Beginning of Article selection box 1556, a Display Section Headings selection box 1558, a Survival selection box 1560, a Description field 1562, an Add Paragraph Text field 1564, a Custom Paragraph OK button 1566, and a Cancel Custom Paragraph button 1568. An article selected in the Add Article (Custom or Existing) drop-down list 1552 may be selected by having made a selection in the Paragraphs in Selected Agreement field 1540 in the Revise Agreements window 1500 or by selecting an article from the Add Article (Custom or Existing) drop-down list 1552. A section heading selected in the Add Section Heading (Custom or Existing) drop-down list 1554 may be selected by having made a selection in the Paragraphs in Selected Agreement field 1540 in the Revise Agreements window 1500 or by selecting a section heading from the Add Section Heading (Custom or Existing) drop-down list 1554. The new paragraph is inserted in a default location after the selected article and section heading. Selecting the Add At Beginning of Article selection box 1556 overrides the default location and inserts the new paragraph at a front part of the article. Selecting the Display Section Headings selection box 1558 will display the selected section heading in a revised contract document. Selecting the Survival selection box 1560 indicates that the new paragraph is included in an existing Survival paragraph. The Description field 1562 is a field in which descriptive text for the new paragraph is entered. Text for the new paragraph is entered in the Add Paragraph Text field 1564. Selecting the Custom Paragraph OK button accepts the information entered in the Add Custom Paragraph window 1550, closes the Add Custom Paragraph window 1550, and displays the Revise Agreements window 1500. Selecting the Cancel Custom Paragraph button closes the Add Custom Paragraph window 1550 without accepting the information entered in the Add Custom Paragraph window 1550 and displays the Revise Agreements window 1500.

Selecting the Modify button 1514 in the Revise Agreements window 1500 accesses a Modify Stock Paragraph window 1580. The functionality of the Modify Stock Paragraph window 1580 modifies a paragraph of a generated contract, an embodiment of which is illustrated according to the present invention in FIG. 15C. Scroll bars are available to scroll beyond initially displayed areas if any displays exceed visible work areas. The Modify Stock Paragraph window 1580 includes a Modify Article (Custom or Existing) drop-down list 1582, a Modify Section Heading (Custom or Existing) drop-down list 1584, an Add At Beginning of Modify Article selection box 1586, a Display Modify Section Headings selection box 1588, a Survival (Modify) selection box 1590, a Description (Modify) field 1592, a Modify Paragraph Text field 1594, an OK (Modify) button 1596, and a Cancel (Modify) button 1598.

By default, an article where a modified paragraph will be inserted is the same as the selected paragraph. By selecting another article from the Modify Article (Custom or Existing) drop-down list 1582, the location where a modified paragraph will be inserted can be changed to another article. Also by default, a section heading where a modified paragraph will be inserted is the same as the selected paragraph. By selecting another section heading from the Modify Section Heading (Custom or existing) drop-down list 1584, the location where the modified paragraph will be inserted can be changed to another section. Selecting the Add Modified At Beginning of Article selection box 1586 overrides the default location of the modified paragraph to a beginning part of the article. Selecting the Display Modify Section Headings selection box 1588 displays the selected section heading in the revised contract document. Selecting the Survival (Modify) selection box 1590 indicates that the modified paragraph will be included in a Survival paragraph in the revised contract. Descriptive text for the modified paragraph is entered in the Description (Modify) field 1592. Text for the modified paragraph is entered in the Modify Paragraph Text field 1594. Selecting the OK (Modify) button 1596 accepts the information entered in the Modify Stock Paragraph window 1580, closes the Modify Stock Paragraph window 1580, and displays the Revise Agreements window 1500. Selecting the Cancel (Modify) button 1598 closes the Modify Stock Paragraph window 1580 without accepting the information entered in the Modify Stock Paragraph window 1580 and displays the Revise Agreements window 1500.

Selecting the Delete button 1516 in the Revise Agreements window 1500 removes a selected paragraph in the Paragraphs in Selected Agreement field 1540 from the generated contract document. Selecting the Undelete button 1518 replaces the paragraph removed by the action of the Delete button 1516. Selecting the Output Agreement button 1520 generates a revised contract document reflecting changes made in the Revise Agreements window 1500, the Add Custom paragraph window 1550, and the Modify Stock Paragraph window 1580. Selecting the Goto Menu button 1530 closes the Revise Agreements window 1500 and displays the Main window 400. Selecting the Goto Stock Paragraphs button 1532 closes the Revise Agreements window 1500 and displays the Edit Section Paragraphs window 600. Selecting the Goto Agreements button 1534 closes the Revise Agreements window 1500 and displays the Create Agreements window 1400.

It will be apparent to those skilled in the art that various modifications and variations can be made in the apparatus and method for negotiating an generating a contract document online without departing from the spirit or scope of the invention. Thus, it is intended that the present invention cover the modifications and variations of this invention provided they come within the scope of the appended claims and their equivalents.

What is claimed is:

1. An apparatus adapted to generate contract documents, the apparatus comprising:
   a plurality of computing platforms;
   a plurality of memory storage devices coupled to the computing platforms, the plurality of memory devices comprising a first memory storage device storing a database of items, a second memory storage device storing rules corresponding to each item, a third memory storage device storing rules corresponding to each requester, a fourth memory storage device storing a database of generated documents, and a secure memory storage device; a plurality of networks coupled to the plurality of computing platforms, the computing platforms capable of receiving and transmitting requests for the items by requesters via the plurality of networks, the computing platforms being programmed to:
   (a) process requests of items by at least one requester by;
      (1) determining if at least one of the items requested is stored in the first memory storage device;
      (2) retrieving rules corresponding to the at least one requestor stored in the third memory storage device;
      (3) retrieving from the second memory storage device rules relating to the requested items;
      (4) generating a document based on relationships between a first set of retrieved rules corresponding to the at least one requester and a second set of retrieved rules corresponding to the requested items;
   (b) display the document on a graphical user interface;
   (c) transmit the document to the at least one requestor over the plurality of networks;

(d) permit the requestor to modify the document and transmit the modified document to the computing platforms;
(e) store the modified document in the secure storage device;
(f) deliver the modified document to at least one human operator for review; and
(g) permit the operator to modify data and the rules in the first, second, and third memory devices.

2. The apparatus as claimed in claim 1, wherein the items in the first memory storage device define products.

3. The apparatus as claimed in claim 1, wherein the rules in the second memory storage device define legally binding rules regarding each of the items stored in the first memory storage device.

4. The apparatus as claimed in claim 1, wherein the rules in the third memory storage device define preferences of each requestor.

5. The apparatus as claimed in claim 1, wherein the secure memory storage device stores the items of the first memory storage device and the rules of the second and third memory storage devices.

6. The apparatus as claimed in claim 1, wherein the plurality of networks includes a public network.

7. The apparatus as claimed in claim 6, wherein the computing platforms are further programmed to deliver the modified document to the at least one human operator for review via the public network.

8. The apparatus as claimed in claim 1, wherein the computing platforms are further programmed to determine if the rules stored in the second memory storage device are valid.

9. The apparatus as claimed in claim 1, wherein the computing platforms are further programmed to determine if the rules stored in the third memory storage device are valid.

10. The apparatus as claimed in claim 1, wherein the computing platforms are further programmed to process the requests of the items by the at least one requestor by determining if the requestor is authorized to access any one of the plurality of memory storage devices.

11. The apparatus as claimed in claim 1, wherein the computing platforms are further programmed to deny access to the plurality of memory storage devices to an unauthorized operator.

12. A method to generate contract documents, the method comprising:
providing at least three databases and a maintenance engine for at least one of the databases;
providing a user an option to select at least a first product and a second product;
receiving a selection of at least said first product and not said second product;
generating at least one document as a function of relationships between the at least three databases, said relationships comprising at least an association between said first product and first standard text and an association between said second product and second standard text, and said generated document incorporating said first standard text and not said second standard text, all of the text of said generated document being generated based on said relationships;
providing the document for review by at least one of a customer, a salesperson, and a legal specialist;
storing the reviewed document in a protected format; and
submitting the document to at least one customer.

13. The method as claimed in claim 12, the method further comprising:
determining if at least one of a plurality of items requested by the salesperson is stored in one of the at least three databases;
retrieving rules corresponding to the at least one customer stored in one of the at least three databases; and
retrieving rules relating to the requested items stored in one of the at least three databases,
said steps of determining, retrieving rules corresponding to the at least one customer and of retrieving rules relating to the requested items being performed prior to said step of generating the requested document.

14. The method as claimed in claim 13, the method further comprising:
determining if the rules corresponding to the at least one customer are valid; and
determining if the rules relating to the requested items are valid,
if the rules corresponding to the at least one customer are determined to be valid, said validated customer rules being included in said relationships based on which said text is generated, and if the rules relating to the requested items are determined to be valid, said validated requested item rules being included in said relationships based on which said text is generated.

15. The method as claimed in claim 12, the method further comprising:
displaying the document on a graphical user interface;
transmitting the document to the at least one of the customer, the salesperson, and the legal specialist over a plurality of networks to a plurality of computing platforms;
permitting the at least one of the customer, the salesperson, and the legal specialist to modify the document and transmit the modified document over the plurality of networks to the plurality of computing platforms;
storing the modified document in a secure storage device;
delivering the modified document to at least one human operator for review; and
permitting the operator to modify data, the rules corresponding to the plurality of customers, and the rules relating to the requested items.

16. The method as claimed in claim 15, the method further comprising:
determining if the customer is authorized to revise the modified document.

17. The method as claimed in claim 12, the method further comprising:
notifying the salesperson that the document is being generated.

18. The method as claimed in claim 15, wherein the step of permitting the at least one of the customer, the salesperson, and the legal specialist to modify the document comprises permitting the at least one of the customer, the salesperson, and the legal specialist to modify any portion of the document.

19. The method as claimed in claim 15, wherein said step of permitting the operator to modify data, the rules corresponding to the plurality of customers, and the rules relating to the requested items, comprises permitting the operator to modify standard text and to associate one or more of the requested items with the modified standard text.

* * * * *